United States Patent
Chatani

(10) Patent No.: US 11,676,588 B2
(45) Date of Patent: Jun. 13, 2023

(54) DIALOGUE CONTROL SYSTEM, DIALOGUE CONTROL METHOD, AND PROGRAM

(71) Applicant: RAKUTEN GROUP, INC., Tokyo (JP)

(72) Inventor: Masayuki Chatani, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 176 days.

(21) Appl. No.: 16/955,778

(22) PCT Filed: Dec. 26, 2017

(86) PCT No.: PCT/JP2017/046549
§ 371 (c)(1),
(2) Date: Jun. 19, 2020

(87) PCT Pub. No.: WO2019/130410
PCT Pub. Date: Jul. 4, 2019

(65) Prior Publication Data
US 2020/0372912 A1      Nov. 26, 2020

(51) Int. Cl.
*G10L 15/22*         (2006.01)
*G06Q 30/0601*    (2023.01)
(Continued)

(52) U.S. Cl.
CPC .......... *G10L 15/22* (2013.01); *G06Q 30/0631* (2013.01); *G10L 15/30* (2013.01); *G06N 20/00* (2019.01); *G10L 2015/223* (2013.01)

(58) Field of Classification Search
USPC ..................................... 704/251, 231, 1–504
See application file for complete search history.

(56) References Cited

U.S. PATENT DOCUMENTS 9,685,152 B2 *    6/2017    Matsubara ............ G10L 13/027
10,490,181 B2 *  11/2019   Matsubara ............. G10L 25/90
(Continued)

FOREIGN PATENT DOCUMENTS

JP      2007148118 A     6/2007
JP      2008090545 A     4/2008
(Continued)

OTHER PUBLICATIONS

Imai, Kenta, Rzepka, Rafal, Araki, Kenji. Performance Evaluation of Method for Selecting Best Replies from Candidate Sentences from Different Dialogue Systems. IPSJ SIG Technical Report Dec. 2009. (See English abstract and English translation of the ISR for PCT/JP2017/046549.)
(Continued)

*Primary Examiner* — Marcus T Riley
(74) *Attorney, Agent, or Firm* — Hea Law PLLC

(57) ABSTRACT

A dialogue control system, comprising at least one processor configured to: acquire remark information about a remark of a user; control a plurality of dialogue generators each for generating, when the remark information is acquired, reply information about a reply to be made in response to the remark indicated by the remark information; and output the reply information generated by at least one of a plurality of dialogue generators, wherein the acquisition of the remark information and the output of the reply information are repeated so that a dialogue progresses, and wherein each of the plurality of dialogue generators is configured to generate new reply information based on the reply information that has been generated and output by another of the plurality of dialogue generators.

10 Claims, 13 Drawing Sheets

(51) Int. Cl.
    *G10L 15/30*          (2013.01)
    *G06N 20/00*         (2019.01)

(56) References Cited

U.S. PATENT DOCUMENTS

| | | | |
|---|---|---|---|
| 11,222,633 B2 * | 1/2022 | Sugiyama | G10L 13/00 |
| 2008/0096533 A1 * | 4/2008 | Manfredi | G06N 3/006 |
| | | | 455/412.1 |
| 2008/0162721 A1 * | 7/2008 | Miyake | G06Q 20/12 |
| | | | 709/238 |
| 2012/0041950 A1 | 2/2012 | Koll et al. | |
| 2012/0078763 A1 | 3/2012 | Koll et al. | |
| 2014/0164197 A1 | 6/2014 | Koll et al. | |
| 2015/0371145 A1 | 12/2015 | Koll et al. | |
| 2016/0086597 A1 * | 3/2016 | Matsubara | G10L 13/0335 |
| | | | 704/243 |
| 2016/0335554 A1 | 11/2016 | Koll et al. | |
| 2017/0069316 A1 * | 3/2017 | Makino | G10L 15/22 |
| 2017/0110111 A1 * | 4/2017 | Matsubara | G10L 13/027 |
| 2017/0345425 A1 | 11/2017 | Ikeno et al. | |
| 2018/0101879 A1 | 4/2018 | Koll et al. | |
| 2019/0206406 A1 * | 7/2019 | Sugiyama | B25J 13/08 |
| 2019/0341046 A1 * | 11/2019 | Ikeno | G10L 15/02 |
| 2020/0372912 A1 * | 11/2020 | Chatani | G06Q 30/0631 |

FOREIGN PATENT DOCUMENTS

| | | |
|---|---|---|
| JP | 2016164788 A | 9/2016 |
| JP | 2017211608 A | 11/2017 |

OTHER PUBLICATIONS

English translation of the International Search Report for PCT/JP2017/046549.

\* cited by examiner

FIG.6

| SHOP ID | BASIC INFORMATION | | ... | AGENT ID | THREE-DIMENSIONAL MODEL INFORMATION |
| --- | --- | --- | --- | --- | --- |
| | SHOP NAME | COMPANY NAME | | | |
| s00001 | FISH SHOP AAA | AAA CORPORATION | ... | a00001 | THREE-DIMENSIONAL MODEL INFORMATION A |
| s00002 | VEGETABLE SHOP BBB | BBB CORPORATION | ... | a00002 | THREE-DIMENSIONAL MODEL INFORMATION B |
| s00003 | MEAT SHOP CCC | CCC CORPORATION | ... | a00003 | THREE-DIMENSIONAL MODEL INFORMATION C |
| ... | ... | ... | | ... | ... |

| SHOP ID | MERCHANDISE INFORMATION ||||||| 
| | MERCHANDISE ID | CATEGORY | MERCHANDISE NAME | PRICE | KEYWORD | MERCHANDISE DESCRIPTION | MERCHANDISE IMAGE |
|---|---|---|---|---|---|---|---|
| s00001 | i00001 | FOOD 〉 FISH 〉 ... | SUZUKI | 200 YEN | THIS, TIME, YEAR, RECOMMEND... | SUZUKI RECOMMENDED THIS TIME OF YEAR... | i00001.jpg |
| | i00002 | FOOD 〉 FISH 〉 ... | TUNA | 500 YEN | YEAR-ROUND, RECOMMEND... | FARMED TUNA. RECOMMENDED YEAR-ROUND... | i00002.jpg |
| | i00003 | FOOD 〉 FISH 〉 ... | AJI | 100 YEN | SASHIMI, FRIED ... | AJI PERFECT FOR SASHIMI. GOOD WHEN FRIED, TOO... | i00003.jpg |
| | i00004 | FOOD 〉 SHELLFISH 〉 ... | OYSTER | 300 YEN | RAW OYSTER, GRILLED OYSTER... | WILD OYSTER... | i00004.jpg |
| | i00005 | FOOD 〉 CRUSTACEA 〉 ... | SHRIMP | 250 YEN | INSHORE CATCH, FRESH... | JUST ARRIVED! FRESH SHRIMP CAUGHT INSHORE... | i00005.jpg |
| ... | ... | ... | ... | ... | ... | ... | ... |

| DIALOGUE ID | USER ID | CONTEXT INFORMATION ||||
| --- | --- | --- | --- | --- | --- |
| | | REMARK MAKER | REMARK DETAILS | SHOP ID/MERCHANDISE ID | REMARK TIME |
| d00001 | u00001 | u00001 | WHAT IS RECOMMENDED THIS TIME OF YEAR? | — | 2017/12/28 11:00:05 |
| | | a00001 | HOW ABOUT SUZUKI? | s00001,i00001 | 2017/12/28 11:00:09 |
| | | u00001 | SUZUKI... SOUNDS GOOD | — | 2017/12/28 11:00:15 |
| | | a00002 | WOULD YOU LIKE TOMATOES, TOO? | s00002,i00005 | 2017/12/28 11:00:21 |
| | | ... | ... | ... | ... |
| d00002 | u00002 | u00002 | TELL ME WHAT IS IN NOW. | — | 2017/12/28 11:00:13 |
| | | a00005 | HOW DO YOU FEEL ABOUT THIS CARDIGAN? | s00005,i00017 | 2017/12/28 11:00:17 |
| | | u00002 | IT'S CUTE! WHAT MATCHES WITH IT? | — | 2017/12/28 11:00:24 |
| | | a00012 | HOW ABOUT THIS PAIR OF SHOES TO GO WITH? | s00012,i00031 | 2017/12/28 11:00:31 |
| | | ... | ... | ... | ... |
| ... | ... | | | | |

| OUTPUT CONDITION | FIXED SENTENCE |
|---|---|
| FIRST REPLY | HOW ABOUT <MERCHANDISE NAME>? |
| USER REJECTS MOST RECENTLY SUGGESTED MERCHANDISE | THEN HOW ABOUT <MERCHANDISE NAME>? |
| USER APPROVES MOST RECENTLY SUGGESTED MERCHANDISE | WOULD YOU LIKE <MERCHANDISE NAME>, TOO? |
| USER EXPRESSES INTENTION TO PURCHASE | THANK YOU |
| ... | ... |

| CONTEXT CONDITION | MERCHANDISE TO BE SUGGESTED |
|---|---|
| SUZUKI, APPROVED | TOMATO |
| SUZUKI, REJECTED | TUNA |
| TUNA, APPROVED | CUCUMBER |
| TUNA, REJECTED | AJI |
| . . . | . . . |

DB5

DIALOGUE CONTROL SYSTEM, DIALOGUE CONTROL METHOD, AND PROGRAM

CROSS REFERENCE TO RELATED APPLICATIONS

This application is a National Stage of International Application No. PCT/JP2017/046549 filed on Dec. 26, 2017. The contents of the above document is incorporated herein by reference in its entirety.

TECHNICAL FIELD

The present invention relates to a dialogue control system, a dialogue control method, and a program.

BACKGROUND ART

Hitherto, there has been known a technology enabling a user to hold dialogue with a computer. In Patent Literature 1, for example, there is described a system in which details of a user's remark are analyzed, and an agent acquires the details of the remark and determines what to reply based on user's preference and other pieces of user-related information.

CITATION LIST

Patent Literature

[PTL 1] JP 2007-148118 A

SUMMARY OF INVENTION

Technical Problem

With the technology described above, the system may be prepared with a plurality of agents from which an agent suitable for details of a user's remark is selected to reply. In this case, however, even when user-related information is used as in Patent Literature 1, each agent only provides its own reply based on the details of the user's remark and the user-related information, and thus has difficulties in providing a reply that fits in the flow of dialogue made up of replies from other agents.

To a degree, an agent succeeds in providing a reply that fits in the flow of dialogue made up of replies from other agents when, for example, the user tells the agent the details of the user's dialogue with other agents. This, however, requires the user to inform each and every agent of the details of the user's dialogue with other agents, and is accordingly a burden to the user.

The one or more embodiments of the present invention has been made to solve the issues described above, and an object of the present invention is therefore to provide a dialogue control system, a dialogue control method, and a program with which a user's burden can be lightened.

Solution to Problem

In response to solve the above-mentioned issues, a dialogue control system according to one embodiment of the present invention includes: acquisition means for acquiring remark information about a remark of a user; a plurality of dialogue means each for generating, when the remark information is acquired, reply information about a reply to be made in response to the remark indicated by the remark information; and output control means for outputting the reply information generated by at least one of the plurality of dialogue means, wherein the acquisition of the remark information by the acquisition means and the output of the reply information by the output control means are repeated so that a dialogue progresses, and wherein each of the plurality of dialogue means is configured to generate new reply information based on the reply information that has been generated by another of the plurality of dialogue means and that has been output under control of the output control means.

A dialogue control method according to one embodiment of the present invention includes: an acquisition step of acquiring remark information about a remark of a user; and an output control step of outputting reply information generated by at least one of a plurality of dialogue means each for generating, when the remark information is acquired, reply information about a reply to be made in response to the remark indicated by the remark information, wherein the acquiring of the remark information in the acquisition step and the outputting of the reply information in the output step are repeated so that a dialogue progresses, and wherein the dialogue control method further includes a step of generating, by each of the plurality of dialogue means, new reply information based on the reply information that has been generated by another of the plurality of dialogue means and that has been output in the output step.

A program according to one embodiment of the present invention causes a computer to function as: acquisition means for acquiring remark information about a remark of a user; a plurality of dialogue means each for generating, when the remark information is acquired, reply information about a reply to be made in response to the remark indicated by the remark information; and output control means for outputting the reply information generated by at least one of the plurality of dialogue means, wherein the acquisition of the remark information by the acquisition means and the output of the reply information by the output control means are repeated so that a dialogue progresses, and wherein each of the plurality of dialogue means is configured to generate new reply information based on the reply information that has been generated by another of the plurality of dialogue means and that has been output under control of the output control means.

Further, in one aspect of the present invention, each of the plurality of dialogue means is configured to generate the new reply information based further on the remark information about a remark made in response to a reply that is indicated by the reply information output under control of the output control means.

Further, in one aspect of the present invention, the reply information includes probability information about a probability of details of a reply, and the dialogue control system further includes determination means for determining the reply information to be output under control of the output control means, based on the probability information included in the reply information generated by each of the plurality of dialogue means.

Further, in one aspect of the present invention, each of the plurality of dialogue means is configured to update the probability information when the remark information is acquired as the dialogue progresses.

Further, in one aspect of the present invention, each of the plurality of dialogue means is configured to determine whether to generate the new reply information without waiting for a reaction of the user, based on the probability information included in the reply information that has been generated by another of the plurality of dialogue means and that has been output under control of the output control means.

Further, in one aspect of the present invention, the dialogue control system further includes: start determination means for determining that the dialogue has started when a predetermined start condition is fulfilled; and end determination means for determining that the dialogue has ended when a predetermined end condition is fulfilled, and each of the plurality of dialogue means is configured to generate the new reply information based on the reply information that has been generated by another of the plurality of dialogue means in a period of any length between a point in time determined by the start determination means as a start of the dialogue and a point in time determined by the end determination means as an end of the dialogue.

Further, in one aspect of the present invention, each of the plurality of dialogue means is configured to generate the new reply information based on a relation between the each of the plurality of dialogue means and another of the plurality of dialogue means that has generated the reply information output under control of the output control means.

Further, in one aspect of the present invention, each of the plurality of dialogue means is associated with a database about merchandise or a service, and each of the plurality of dialogue means is configured to generate the new reply information for suggesting, to the user, the merchandise or service different from the merchandise or service of another of the plurality of dialogue means, based on the database associated with the each of the plurality of dialogue means.

Further, in one aspect of the present invention, each of the plurality of dialogue means is configured to generate the new reply information for suggesting, to the user, the merchandise or service related to the merchandise or the service that has been suggested by another of the plurality of dialogue means.

Further, in one aspect of the present invention, the dialogue control system further includes execution means for executing processing for providing a combination of suggested pieces of merchandise or a combination of suggested services to the user, based on the remark information about a remark made after the combination of pieces of merchandise or the combination of services is suggested to the user by each of the plurality of dialogue means.

Further, in one aspect of the present invention, the acquisition means is configured to acquire the remark information based on a speech of the user that has been detected by audio input means.

Advantageous Effects of Invention

According to one or more embodiments of the present invention, it is possible to lighten a user's burden.

BRIEF DESCRIPTION OF DRAWINGS

FIG. 6 is a table for showing an example of a virtual market database.
FIG. 7 is a table for showing an example of a merchandise database.
FIG. 8 is a table for showing an example of a dialogue database.
FIG. 9 is a table for showing an example of a fixed sentence database.
FIG. 10 is a table for showing an example of a reply database.

DESCRIPTION OF EMBODIMENTS

[1. Overall Configuration of the Dialogue Control System]

Figure 1:
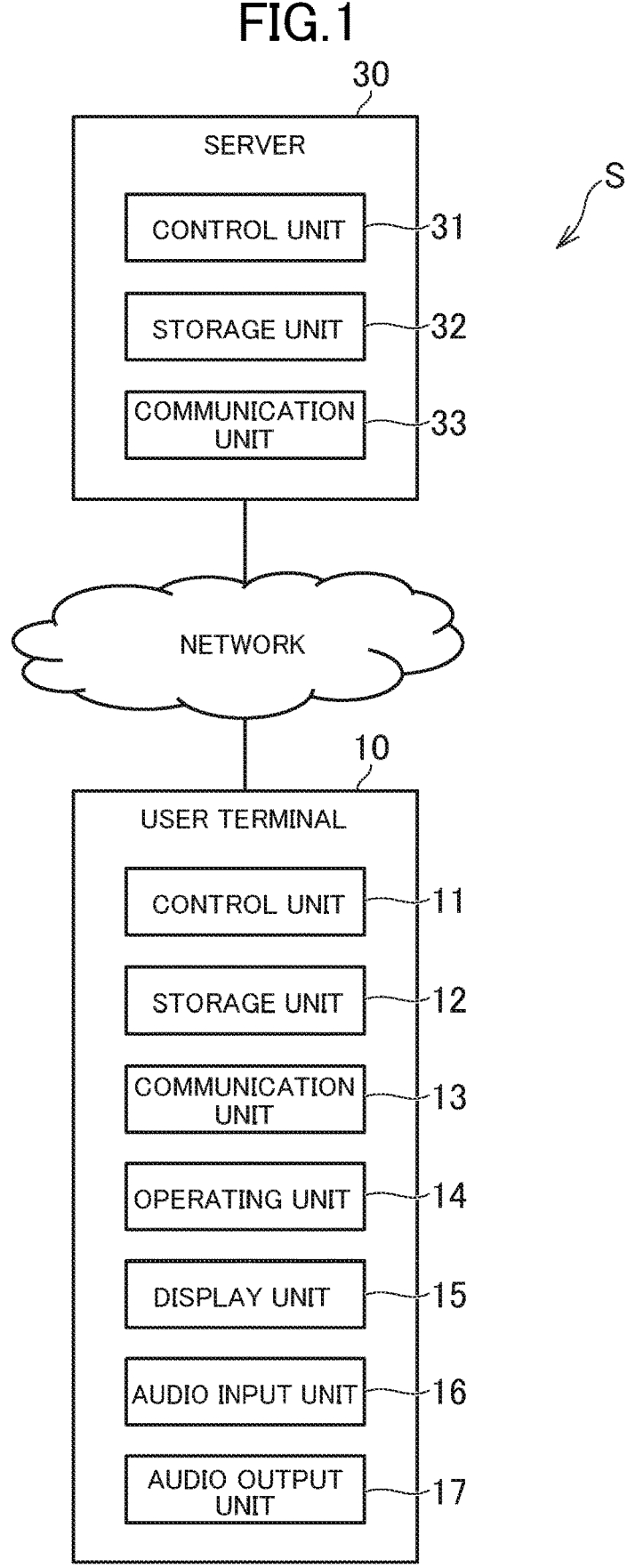
FIG. 1 is a diagram for illustrating the overall configuration of a dialogue control system.

An example of a dialogue control system according to an embodiment of the present invention is described below. FIG. 1 is a diagram for illustrating the overall configuration of the dialogue control system. As illustrated in FIG. 1, a dialogue control system S includes a user terminal 10 and a server 30. The user terminal 10 and the server 30 are connectable to the Internet and other networks.

While one user terminal 10 and one server 30 are illustrated in FIG. 1, the dialogue control system S may include a plurality of user terminals 10 and may include a plurality of servers 30. The dialogue control system S may also include a computer other than the user terminal 10 and the server 30.

The user terminal 10 is a computer to be operated by a user. The user terminal 10 is, for example, a smartphone or another cell phone, a tablet computer or another mobile terminal, a personal computer, or a smart speaker (AI speaker). As illustrated in FIG. 1, the dialogue control system S includes a control unit 11, a storage unit 12, a communication unit 13, an operating unit 14, a display unit 15, an audio input unit 16, and an audio output unit 17.

The control unit 11 includes at least one microprocessor. The control unit 11 executes processing as programmed by programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive.

The communication unit 13 is a communication interface for wired communication or wireless communication, and performs data communication via the network. The operating unit 14 is an input device, which is, for example, a pointing device such as a touch panel and a mouse, a keyboard, or a button. The operating unit 14 transmits details of operation by the user to the control unit 11.

The display unit 15 is, for example, a liquid crystal display unit or an organic EL display unit. The display unit 15 displays a screen in accordance with an instruction of the control unit 11. The audio input unit 16 includes at least one microphone. The audio input unit 16 detects a sound and converts the sound into digital data. The audio output unit 17 includes at least one speaker. The audio output unit 17 outputs a sound based on audio data. The audio data may have any data format, for example, the HE-AAC format, the MP3 format, the Vorbis format, the WAV format, or the FLAC format.

The server 30 is a server computer. For example, the server 30 includes a control unit 31, a storage unit 32, and a communication unit 33. Hardware configurations of the control unit 31, the storage unit 32, and the communication unit 33 are the same as those of the control unit 11, the storage unit 12, and the communication unit 13, respectively. Therefore, the description thereof is omitted.

Programs and data described as being stored into the storage units 12 and 32 may be supplied thereto via a network. Further, the respective hardware configurations of the user terminal 10 and the server 30 are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied through intermediation of the reading unit or the input/output unit.

[2. Outline of the Dialogue Control System]

The dialogue control system S allows a user to hold dialogue with an interactive agent. An agent is software for executing a predetermined task, and executes the task based on what is input by a user. An interactive agent is an agent for executing a task by holding dialogue with a user, and executes the task with details of the user's remark as input. The user may use audio input or text input to make a remark. Similarly, an agent may reply in the form of a sound, or in the form of text or an image.

An agent may execute any task, for example, a task of providing assistance in purchasing merchandise, a task of providing assistance in using a service, a task of providing assistance in a search of content such as websites, music, and images, or a task of simply serving as a conversation partner for a user.

The description of this embodiment takes as an example an agent for executing a task of providing assistance in purchasing merchandise on the Internet. For example, a virtual market screen depicting a virtual market on the Internet is displayed on the display unit 15 when a user operates the user terminal 10 to access the server 30.

Figure 2:
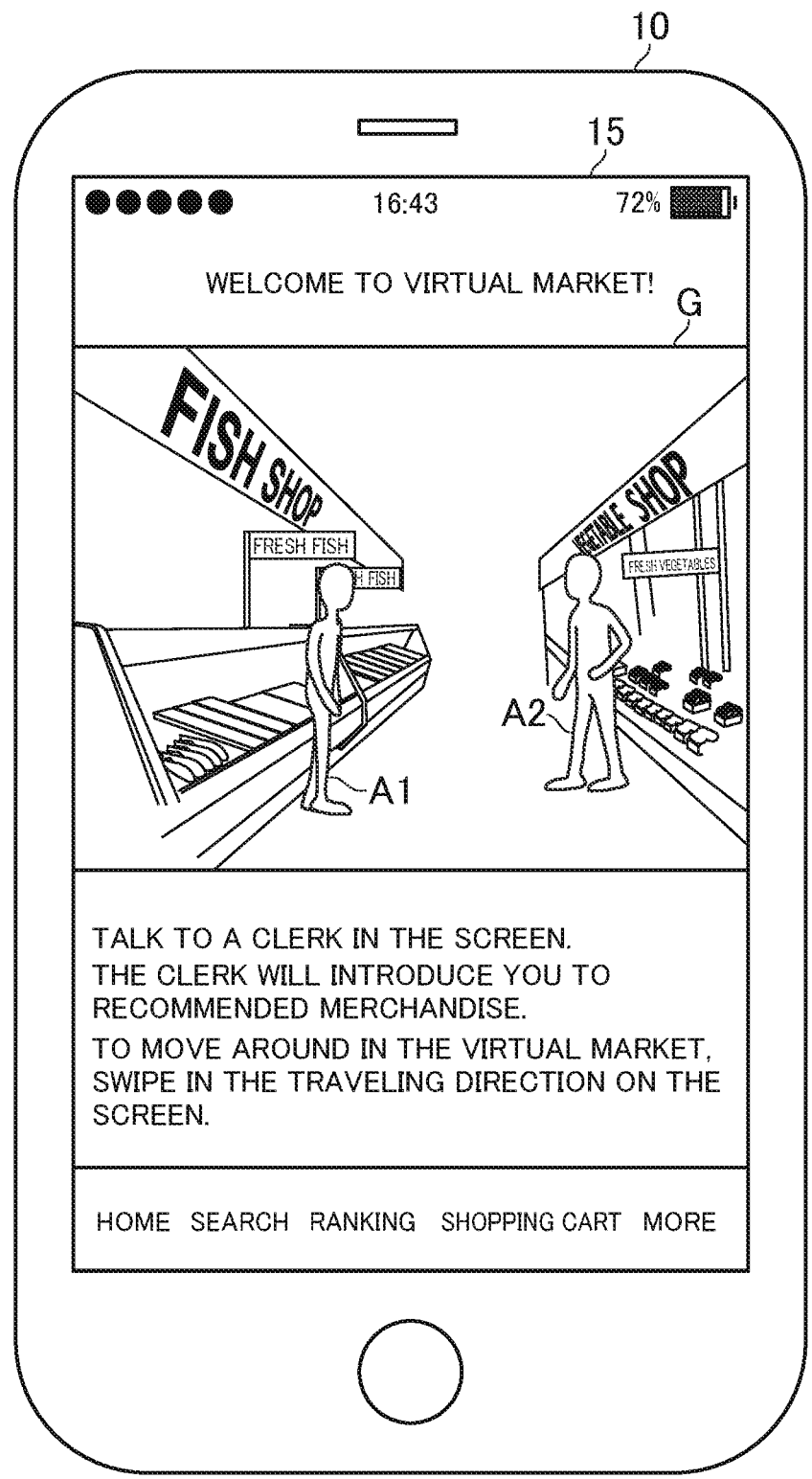
FIG. 2 is a diagram for illustrating an example of a virtual market screen.

FIG. 2 is a diagram for illustrating an example of the virtual market screen. The description given here takes as an example a case in which the user terminal 10 is a smartphone. As illustrated in FIG. 2, a virtual market screen G displays how a virtual market in a virtual space looks. For example, three-dimensional models of a plurality of shops are arranged in the virtual space, and the user is allowed to move around inside the virtual space.

The virtual market screen G displays agent images A1 and A2 representing agents. In the following description, the agent images A1 and A2 are simply referred to as "agent images A" when it is not particularly required to discriminate the agent images A1 and A2 from each other. In this embodiment, an agent is prepared for each shop in the virtual market, and the agent image A of a shop is an image emulating a clerk of the shop. For example, the agent image A may be an image of an actual person or an image of an imaginary character.

The virtual market screen G of FIG. 2 displays a view presented to the user who is virtually standing in front of a fish shop and a vegetable shop in the virtual market. For example, the agent image A1 represents an agent of the fish shop and the agent image A2 represents an agent of the vegetable shop. When the user makes some remark in this state, one of the agents replies in order to assist in purchasing merchandise.

Figure 3:
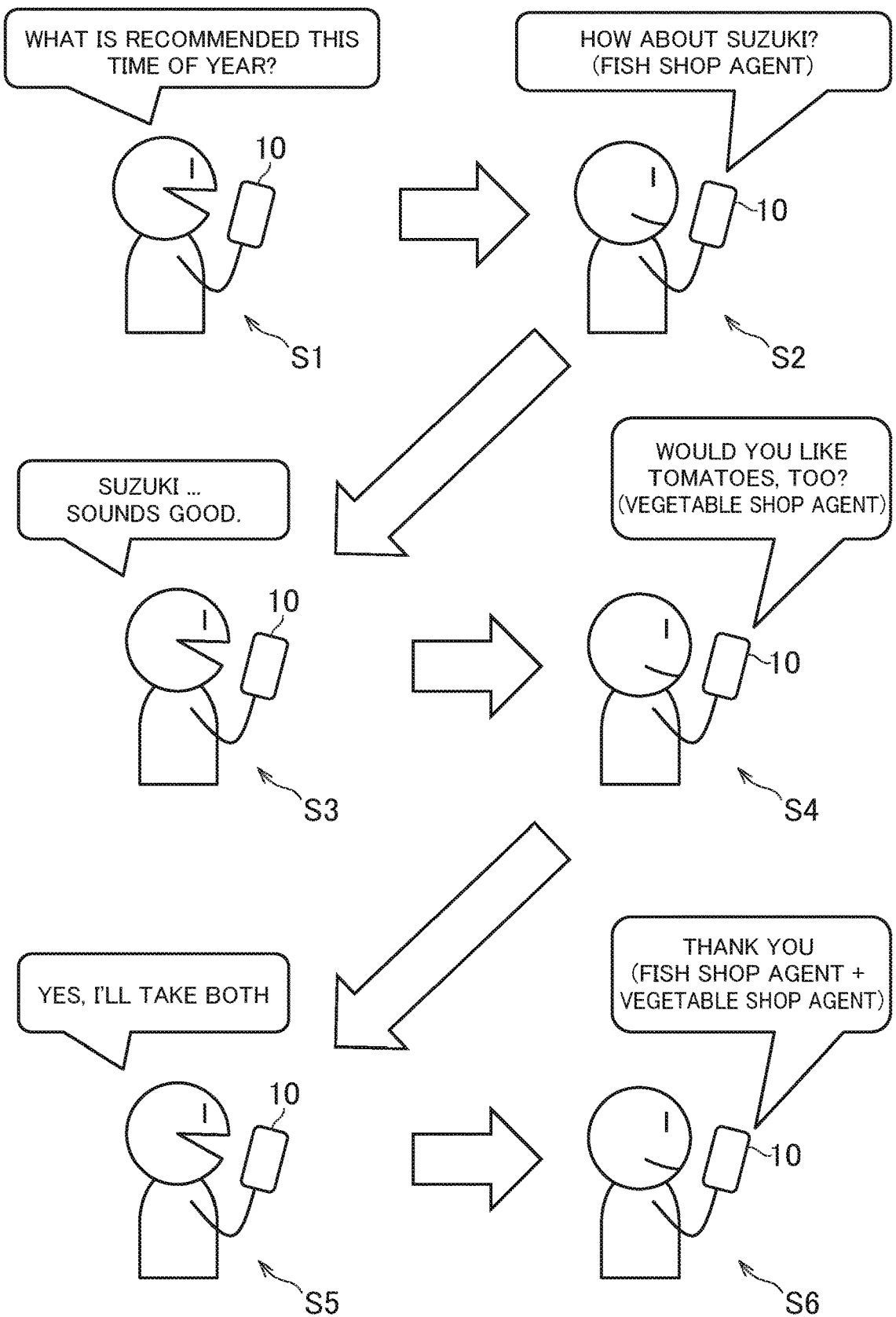
FIG. 3 is a diagram for illustrating how dialogue is held between a user and an agent.

FIG. 3 is a diagram for illustrating how dialogue is held between the user and an agent. As illustrated in FIG. 3, when the user says, for example, "What is recommended this time of year?" (Step S1 in FIG. 3), the user terminal 10 transmits audio data detected by the audio input unit 16 to the server 30. The server 30 analyzes the received audio data, converts the audio data into text data, and inputs the text data to the fish shop agent and the vegetable shop agent.

The agents each calculate details of a reply and a probability based on the input text data. The details of the reply are about merchandise of the shop that is associated with the agent. For example, the details of the reply are about fish carried by the fish shop in the case of the fish shop agent, and about vegetables carried by the vegetable shop in the case of the vegetable shop agent.

The probability is, for example, the likelihood of the user wanting merchandise, and is paraphrased as the accuracy of details of the reply. In other words, the probability is the likelihood of the reply being interesting to the user. In this embodiment, details of a reply are details of a piece of merchandise, and a higher probability accordingly means a higher likelihood of the user wanting a piece of merchandise that is indicated by details of the reply, while a lower probability means a lower likelihood of the user wanting the piece of merchandise.

In this case, text data including words such as "this", "time", "year", and "recommend" is input, and each agent therefore uses those words as search keywords to, for example, search merchandise of the shop associated with the agent, calculate a score for each piece of merchandise in the search, and acquire the score as the probability. The score is the degree of match to a keyword, and is paraphrased as information indicating search accuracy. A higher score means a higher degree of match to a search keyword, and a lower score means a lower degree of match to a search keyword.

For example, the fish shop agent searches a merchandise database DB2 of the fish shop, and finds out from a merchandise description that a piece of merchandise "Suzuki (sea bass)" has a high score. The fish shop agent in this case generates a reply including the name of this piece of merchandise, such as "How about Suzuki?", and sets a high probability because of the high score.

The vegetable shop agent, on the other hand, only finds pieces of merchandise whose scores are not so high as a result of a search of the merchandise database DB2 of the vegetable shop. The vegetable shop agent in this case generates some reply but sets the probability low because of the low scores. While each agent replies despite a low probability in the case described here, the dialogue control system S may be configured so that no reply is made when the probability is lower than a threshold value.

The server 30 acquires the reply and the probability from each agent, and generates audio data indicating the reply that has a higher probability (in this case, the reply of the fish shop agent). The server 30 transmits the audio data to the user terminal 10, and a speech, for example, "How about Suzuki?" is output as a reply of the fish shop agent from the audio output unit 17 of the user terminal 10 (Step S2 in FIG. 3).

When the user responds to the suggestion with, for example, "Suzuki . . . Sounds good" (Step S3 in FIG. 3), text data indicating this reply is input to the agents. The agents take into consideration the flow of dialogue up to that point as well as this reply in calculating details of the next reply and the probability. In this case, the agents take into consideration the fish shop agent's reply: "How about Suzuki?", as well.

For example, the fish shop agent searches the merchandise database DB2 of the fish shop for apiece of merchandise to be suggested along with "Suzuki", but finds no such merchandise in the merchandise database DB2 of the fish shop. The fish shop agent in this case determines some reply but sets the probability low because there are no hits in the search for the merchandise.

The vegetable shop agent, meanwhile, searches for a piece of merchandise to be suggested along with "Suzuki". For example, "tomato", which is used in a dish called "tomato soup with Suzuki", is defined as a piece of merchandise to be suggested along with "Suzuki", and this piece of merchandise is found in the merchandise database DB2 of the vegetable shop. The vegetable shop agent in this case generates a reply including the name of this piece of merchandise, for example, "Would you like tomatoes, too?", and sets a high probability because the piece of merchandise is a hit in the search.

The server 30 acquires the reply and the probability from each agent, and generates audio data indicating the reply that has a higher probability (in this case, the reply of the vegetable shop agent). The server 30 transmits the audio data to the user terminal 10, and a speech, for example, "Would you like tomatoes, too?" is output as a reply of the vegetable shop agent from the audio output unit 17 of the user terminal 10 (Step S4 in FIG. 3).

When the user responds to the speech with, for example, "Yes, I'll take both" (Step S5 in FIG. 3), text data including the words "I'll take", which indicate an intention to purchase, is input, each agent accordingly adds the piece of merchandise recommended by the agent to the user's shopping cart, and a reply, for example, "Thank you" is output (Step S6 in FIG. 3). In this case, "Suzuki" of the fish shop and "tomato" of the vegetable shop are added to the user's shopping cart. The user can subsequently purchase the pieces of merchandise placed in the shopping cart.

While the user approves the piece of merchandise recommended by the fish shop agent, namely, "Suzuki", in the example described above, each agent changes its subsequent reply depending on the user's reaction.

Figure 4:
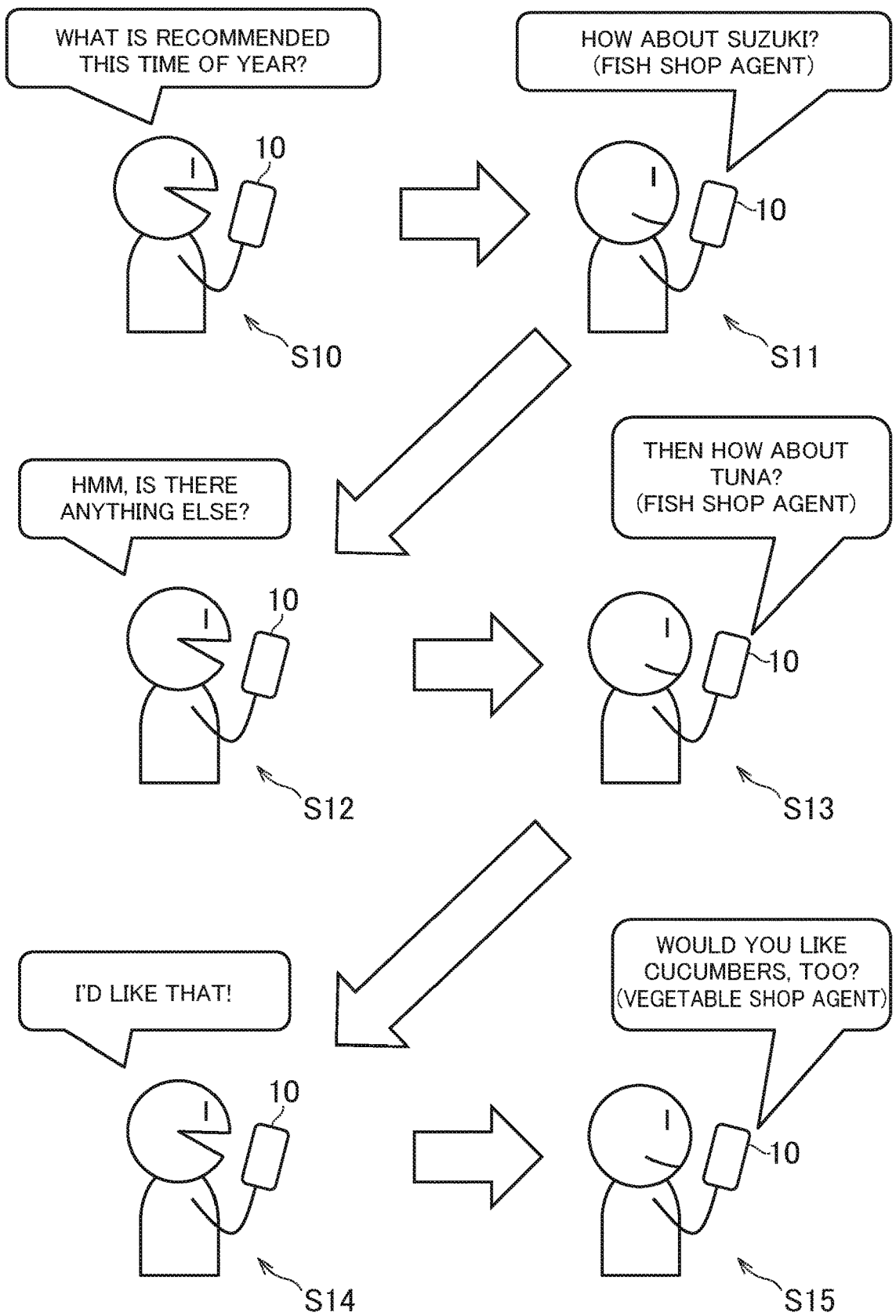
FIG. 4 is a diagram for illustrating how details of an agent's reply change depending on a user's reaction.

FIG. 4 is a diagram for illustrating how details of the agent's reply change depending on the user's reaction. An example of FIG. 4 is the same as FIG. 3 up through a point at which the fish shop agent responds with "How about Suzuki?" (Step S11 in FIG. 4) to the user's remark "What is recommended this time of year?" (Step S10 in FIG. 4).

The user responds to the suggestion with "Hmm, is there anything else?" (Step S12 in FIG. 3). In this case, the user rejects the piece of merchandise recommended by the fish shop agent, namely, "Suzuki", and hence, unlike in the example of FIG. 3, each agent takes the user's reaction into consideration in calculating details of the next reply and the probability.

For example, the fish shop agent searches for a piece of merchandise that is of a different type from "Suzuki", and finds a piece of merchandise "tuna" in the merchandise database DB2 of the fish shop as a result of the search. The fish shop agent in this case generates a reply including the name of this piece of merchandise, for example, "Then how about tuna?", and sets the probability high because the piece of merchandise is a hit in the search.

The vegetable shop agent, on the other hand, searches for a piece of merchandise that is of a different type from "Suzuki", but finds no such merchandise in the merchandise database DB2 of the vegetable shop. The fish shop agent in this case determines some reply but sets the probability low because there are no hits in the search for the merchandise.

The server 30 acquires the reply and the probability from each agent, and generates audio data indicating the reply that has a higher probability (in this case, the reply of the fish shop agent). The server 30 transmits the audio data to the user terminal 10, and a speech, for example, "Then how about tuna?" is output as a reply of the fish shop agent from the audio output unit 17 of the user terminal 10 (Step S13 in FIG. 3).

When the user responds to the suggestion with, for example, "I'd like that!" (Step S14 in FIG. 3), the agents take into consideration the flow of dialogue up to that point as well as this reply, namely, "I'd like that!", in calculating details of the next reply and the probability. In this case, the fish shop agent's reply, namely, "Then how about tuna?", is also taken into consideration. The other reply of the fish shop agent, namely, "How about Suzuki?" may be taken into consideration as well, but is not considered here because of the user's negative reaction to the suggestion.

For example, the fish shop agent searches for a piece of merchandise to be suggested along with "tuna", but finds no such merchandise in the merchandise database DB2 of the fish shop. The fish shop agent in this case determines some reply but sets the probability low because there are no hits in the search for the merchandise.

The vegetable shop agent, meanwhile, searches for a piece of merchandise to be suggested along with "tuna". For example, "cucumber", which is used in a dish called "ahi poke with tuna and cucumber", is defined as a piece of merchandise to be suggested along with "tuna", and this piece of merchandise is found in the merchandise database DB2 of the vegetable shop. The vegetable shop agent in this case generates a reply including the name "cucumber" of this piece of merchandise, for example, "Would you like cucumbers, too?", and sets a high probability because the piece of merchandise is a hit in the search.

The server 30 acquires the reply and the probability from each agent, and generates audio data indicating the reply that has a higher probability (in this case, the reply of the vegetable shop agent). The server 30 transmits the audio data to the user terminal 10, and a speech, for example, "Would you like cucumbers, too?" is output as a reply of the vegetable shop agent from the audio output unit 17 of the user terminal 10 (Step S15 in FIG. 3). When the user subsequently expresses his or her intention to purchase, "tuna" and "cucumber" are added to the shopping cart as in FIG. 3.

While the vegetable shop agent suggests a piece of merchandise after the user reacts to a piece of merchandise suggested by the fish shop agent in the examples of FIG. 3 and FIG. 4, the vegetable shop agent may suggest a piece of merchandise without particularly waiting for the user's reaction.

For instance, in the example of FIG. 2 and FIG. 3, the vegetable shop agent may make its suggestion: "Would you like tomatoes, too?", immediately after and in succession to the fish shop agent's suggestion: "How about Suzuki?". To give another example, in the example of FIG. 3, the vegetable shop agent may make its suggestion: "Would you like cucumbers, too?", immediately after and in succession to the fish shop agent's suggestion: "Then how about tuna?".

The vegetable shop agent may also determine whether to suggest a piece of merchandise without waiting for the user's reaction, based on the probability of the fish shop agent's reply. For instance, the vegetable shop agent may determine to suggest a piece of merchandise without waiting for the user's reaction when the probability of the fish shop agent's reply is equal to or higher than a threshold value, because a probability equal to or higher than the threshold value means that the likelihood of the user approving is very high. When the probability of the fish shop agent's reply is lower than the threshold value, on the other hand, the vegetable shop agent may wait for the user's reaction because a probability lower than the threshold value means that the likelihood of the user approving is not so high.

As described above, the dialogue control system S according to this embodiment is designed to lighten a burden imposed on a user in an attempt to provide a reply that fits in the flow of dialogue held between the user and a plurality of agents, by configuring each of the plurality of agents so that the agent takes details of replies from other agents into consideration in addition to the most recent remark of the user and the agent's own replies in generating a reply. Details of this technology are described below.

[3. Functions Implemented in the Dialogue Control System]

Figure 5:
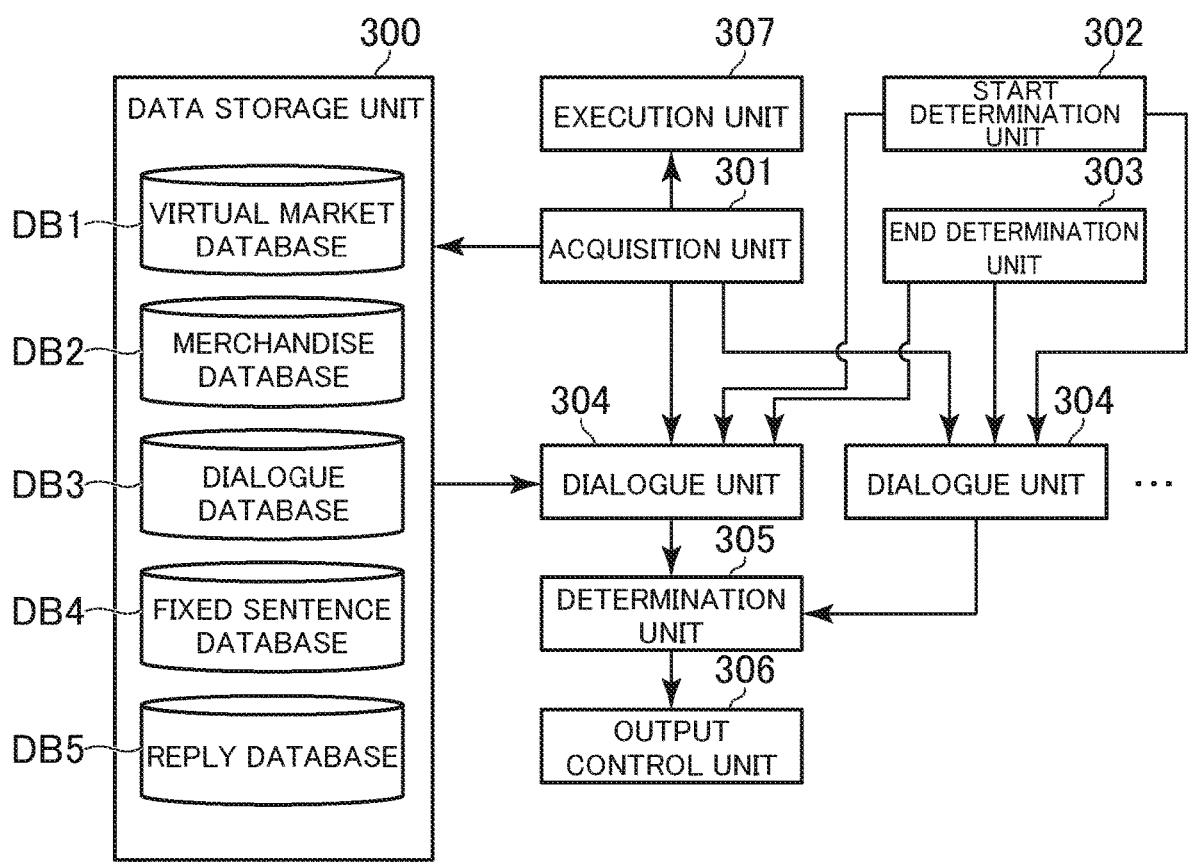
FIG. 5 is a functional block diagram for illustrating an example of functions that are implemented in the dialogue control system.

FIG. 5 is a functional block diagram for illustrating an example of functions that are implemented in the dialogue control system S. As illustrated in FIG. 5, a data storage unit 300, an acquisition unit 301, a start determination unit 302, an end determination unit 303, a plurality of dialogue units 304, a determination unit 305, an output control unit 306, and an execution unit 307 are implemented in the dialogue control system S. A case in which the functions are implemented by the server 30 is described in this embodiment. While two dialogue units 304 are illustrated in FIG. 5, the number of dialogue units 304 may be three or more.

[3-1. Data Storage Unit]

The data storage unit 300 is implemented mainly by the storage unit 32. The data storage unit 300 stores data required for dialogue with a user. A virtual market database DB1, the merchandise database DB2, a dialogue database DB3, a fixed sentence database DB4, and a reply database DB5 are described as an example of the data stored in the data storage unit 300.

FIG. 6 is a table for showing an example of the virtual market database DB1. As shown in FIG. 6, the virtual market database DB1 is a database for storing information about shops of the virtual market. For example, the virtual market database DB1 stores, for each shop, a shop ID with which the shop is uniquely identified, basic information of the shop, an agent ID with which an agent of the shop is uniquely identified, and three-dimensional model information about a three-dimensional model of the shop in a virtual three-dimensional space.

The basic information may be any piece of information about the shop on the Internet, for example, the name of the shop, the name of a company running the shop, an address, a phone number, and an email address. The three-dimensional model information is, for example, information about the location of the shop in the virtual three-dimensional space, the three-dimensional model of the shop, a three-dimensional model of a clerk, and a texture on which those are to be mapped.

FIG. 7 is a table for showing an example of the merchandise database DB2. As shown in FIG. 7, the merchandise database DB2 is a database for storing information about merchandise of each shop. While the merchandise database DB2 is prepared for each shop in the case described here, all shops may share one merchandise database DB2.

FIG. 7 takes as an example the merchandise database DB2 of the fish shop in the virtual market, but the same data structure is used in the merchandise databases DB2 of other shops, too. For example, the merchandise database DB2 stores, for each shop, a shop ID, a merchandise ID with which a piece of merchandise is uniquely identified, and merchandise information.

The merchandise information is information about a piece of merchandise, and a category, a merchandise name, a price, a keyword, a merchandise description, a merchandise image, and other types of information are stored as the merchandise information. The category is classification information of the piece of merchandise and is also called a genre. The merchandise name is the name of the piece of merchandise and entered by, for example, the shop.

The price is a numerical value indicating how much the piece of merchandise costs.

The keyword is a search keyword for the piece of merchandise and may be, for example, a word entered by the shop or one of words in the merchandise description that is extracted as a keyword. The merchandise description is writing, a table, or the like that describes the piece of merchandise, and is entered by, for example, the shop. The merchandise image may be a photographed image of the piece of merchandise, or a photographed image of an object resembling the piece of merchandise. Details of the merchandise information are not limited to the example given above. The merchandise information may include any details about a piece of merchandise, for example, a feature vector that is acquired by numerical conversion of a feature of the piece of merchandise.

FIG. 8 is a table for showing an example of the dialogue database DB3. As shown in FIG. 8, the dialogue database DB3 is a database for storing information about dialogue between a user and an agent. For example, the dialogue database DB3 stores, for each dialogue held in the dialogue control system S, a dialogue ID with which the dialogue is uniquely identified, a user ID with which a user participating in the dialogue is uniquely identified, and context information.

The context information is information about the context of the dialogue. A context is a serial flow (thread) of a dialogue, and is paraphrased as a history of remarks in the dialogue. For example, a remark maker, remark details, a shop ID, a merchandise ID, and a remark time are stored as the context information. Each record included in the context information holds an individual remark made by a user or an agent.

The remark maker is one of a user and an agent, and a user ID or an agent ID, for example, is accordingly stored as the remark maker. The remark details are details of a remark made by the user or the agent. For example, text data converted from audio data is stored as details of the user's remark. To give another example, details of a reply that are indicated by reply information generated by the agent are stored as details of the agent's remark.

The shop ID is a shop ID assigned to a shop of the agent that has suggested a piece of merchandise. The merchandise ID is a merchandise ID assigned to the piece of merchandise that has been suggested by the agent. Values are stored as the shop ID and the merchandise ID when there is a piece of merchandise that has been suggested by the agent. Accordingly, values of the shop ID and the merchandise ID are stored in a record in which an agent ID is stored as the remark maker. Values stored as the shop ID and the merchandise ID enable the execution unit 307, which is described later, to execute processing of placing the piece of merchandise in the shopping cart when the user expresses his or her intention to purchase. The remark time is a time at which the user or the agent has made the remark. As indicated by the remark time, remarks of the user or agents are stored in time series in the context information.

FIG. 9 is a table for showing an example of the fixed sentence database DB4. As shown in FIG. 9, the fixed sentence database DB4 is a database for storing information about fixed sentences of replies. For example, the fixed sentence database DB4 stores an output condition and text of a fixed sentence.

The output condition is a condition for selecting a fixed sentence, and indicates a scene in which the fixed sentence is selected. The output condition may be, for example, a condition solely about details of the user's most recent remark, or a condition about the context up to the present. The context information serves as a basis for the determination of whether an output condition is fulfilled, details of which are described later.

In a data storage example of FIG. 9, a fixed sentence "How about <merchandise name>?", for example, is selected as the first reply in a dialogue. Of the fixed sentence, the "<merchandise name>" part is tag information, and any letter string may be inserted in the part. For instance, the name of a piece of merchandise found in a search by an agent is inserted in the "<merchandise name>" part. Other than the merchandise name, any type of information that is included in the merchandise information may be inserted in the fixed sentence, and the inserted information may be the merchandise image. In this case, a speech may be output along with the merchandise image as the agent's reply.

A fixed sentence "Would you like <merchandise name>, too?", for example, is selected when the user approves the most recently suggested piece of merchandise. When the user rejects the most recently suggested piece of merchandise, a fixed sentence "Then how about <merchandise name>?", for example, is selected. A fixed sentence "Thank you", for example, is selected when the user expresses his or her intention to purchase.

FIG. 10 is a table for showing an example of the reply database DB5. As shown in FIG. 10, the reply database DB5 is a database for storing, for example, information about merchandise to be suggested to a user. The reply database DB5 defines, for example, the relation between a context condition about the context of a dialogue and a piece of merchandise to be suggested.

The context condition is a condition about a piece of merchandise mentioned in the dialogue, and a merchandise name, for example, is stored as the context condition. Other than the merchandise name, any details included in the merchandise information may be stored as the context condition, and the merchandise category, words in the merchandise description, or the like may be stored. The context condition here is a condition about the merchandise name of the most recently suggested piece of merchandise and the user's reaction to the suggested merchandise. For example, "positive", "negative", and "neither" are stored as the user's reaction. The context information serves as a basis for the determination of whether a context condition is fulfilled, details of which are described later.

The merchandise to be suggested is information about a piece of merchandise to be suggested when the context condition is fulfilled. The information about merchandise to be suggested may be any type of information included in the merchandise information, for example, the category, the merchandise name, the price, or the keyword. A case in which the merchandise name of a piece of merchandise to be suggested is stored is described here.

In a data storage example of FIG. 10, "tomato", for example, is defined as the merchandise to be suggested when the most recently suggested piece of merchandise is "Suzuki" and the user makes a "positive" remark including such words and phrases as "Sounds good" and "Yes" in response. On the other hand, "tuna" is defined as the merchandise to be suggested when the most recently suggested piece of merchandise is "Suzuki" and the user makes a "negative" remark including such words and phrases as "Hmm" and "Don't like it" in response.

"Cucumber", for example, is defined as the merchandise to be suggested when the most recently suggested piece of merchandise is "tuna" and the user reacts positively to the suggestion. "Aji (Horse Mackerel)", for example, is defined as the merchandise to be suggested when the most recently suggested piece of merchandise is "tuna" and the user reacts negatively to the suggestion.

Data stored in the data storage unit 300 is not limited to the example given above. For instance, the data storage unit 300 may store, for each shop, a program of the shop's agent. The data storage unit 300 may also store a user database related to basic information of a user. A user ID, a user name, credit card information or other types of payment information, the merchandise ID of a piece of merchandise placed in a shopping cart, and the like may be stored as the basic information.

The data format of the pieces of data is also not limited in the example given above. For instance, while the fixed sentence database DB4 and the reply database DB5 are described above as databases in a table format, data in the databases may be defined in the form of a mathematical expression, or the same data may be defined as part of a program code (algorithm). For instance, the same relations as those in the fixed sentence database DB4 and the reply database DB5 may be defined as part of a machine learning algorithm of each agent.

[3-2. Acquisition Unit]

The acquisition unit 301 is implemented mainly by the control unit 31. The acquisition unit 301 acquires remark information about a user's remark. The user may use audio input or text input to make a remark. The remark information may have any data format. For example, the remark information may be audio data, text data, or data containing audio data and text data both.

When the user uses audio input to make a remark, for example, the acquisition unit 301 acquires the remark information based on the user's speech detected by the audio input unit 16. For instance, the acquisition unit 301 may acquire audio data that is generated from a detection signal of the audio input unit 16 as the remark information without modifying the audio data, or may acquire text data that is converted from the audio data as the remark information.

A known speech recognition algorithm is applicable as the method of converting audio data into text data. For example, a speech recognition algorithm including at least one of a statistical method, a dynamic time warping method, and a hidden Markov model may be used.

When the user uses text input to make a remark, for example, the acquisition unit 301 acquires the remark information based on text that is input from the operating unit 14. For instance, the acquisition unit 301 acquires text that is identified based on a detection signal of the operating unit 14 as the remark information.

The user may input text from a physical operating member of the operating unit 14, or may input text with the use of a software keyboard displayed on the display unit 15.

A case in which the user uses audio input to make a remark and the remark information is text data corresponding to audio data is described in this embodiment. The acquisition unit 301, which is implemented by the server 30 in the case described here, acquires audio data from the user terminal 10 via the communication unit 33 and acquires text data that is converted from the audio data as the remark information.

The conversion from audio data to text data may be executed by a computer other than the server 30 (e.g., the user terminal 10 or another server computer). The acquisition unit 301 in this case acquires the remark information from the computer via the communication unit 33 without executing the conversion.

Dialogue progresses through, for example, repetition of the acquisition of the remark information by the acquisition unit 301 and the output of the reply information by the output unit, which is described later. For instance, one execution of the acquisition of the remark information and one execution of the output of the reply information are alternated so that the user and an agent take turns in making one remark.

To give another example, the output of the reply information may be executed after the acquisition of the remark information is executed a plurality of times so that an agent replies after the user makes a plurality of remarks. To give still another example, the acquisition of the remark information may be executed after the output of the reply information is executed a plurality of times so that the user replies after an agent makes a plurality of remarks.

[3-3. Start Determination Unit]

The start determination unit 302 is implemented mainly by the control unit 31. The start determination unit 302 determines that dialogue has started when a predetermined start condition is fulfilled. The start condition is any condition that signals the start of dialogue.

The start determination unit 302 here is implemented by the server 30, and accordingly determines whether the start condition is fulfilled by determining whether predetermined data has been received from the user terminal 10 via the communication unit 33. The start determination unit 302 determines that the start condition is fulfilled when, for example, it is confirmed that the predetermined data has been received.

In this embodiment, the user is allowed to hold dialogue with an agent when the virtual market screen G is displayed, and the start determination unit 302 accordingly determines whether a display request to display the virtual market screen G has been received from the user terminal 10. The start determination unit 302 determines that the start condition is fulfilled when determining that the display request has been received from the user terminal 10.

The user uses audio input to make a remark in the case described here, and the start determination unit 302 may accordingly determine, for example, whether audio data has been acquired from the user terminal 10 via the communication unit 33. The start determination unit 302 may determine that the start condition is fulfilled when determining that audio data has been received from the user terminal 10.

In this case, the start determination unit 302 may determine that the start condition is fulfilled when there is some audio data that has been received, or may determine whether the start condition is fulfilled based on details of a speech that is indicated by audio data. For example, a phrase that signals the start of dialogue may be determined in advance so that the start determination unit 302 determines whether the phrase has been detected based on the audio data acquired from the user terminal 10. The start determination unit 302 determines that the start condition is fulfilled when determining that the phrase has been detected.

The start condition is any condition determined in advance, and is not limited to the example given above. For instance, the start condition may be the detection of predetermined operation on the operating unit 14 or the detection of access from the user terminal 10 to a predetermined page in the server 30. The predetermined operation may be, for example, the operation of selecting the agent image A1 or A2. The dialogue control system S in this case may be configured so that the user is allowed to specify which agent the user talks to first.

[3-4. End Determination Unit]

The end determination unit 303 is implemented mainly by the control unit 31. The end determination unit 303 determines that dialogue has ended when a predetermined end condition is fulfilled. The end condition is any condition that signals the end of dialogue.

The end determination unit 303 here is implemented by the server 30, and accordingly determines whether the end condition is fulfilled by determining whether predetermined data has been received from the user terminal 10 via the communication unit 33. For instance, the start determination unit 302 may determine that the end condition is fulfilled when it is confirmed that the predetermined data has been received, or may determine that the end condition is fulfilled when no reception of the predetermined data lasts for a predetermined length of time.

In this embodiment, the user is allowed to hold dialogue with an agent while the virtual market screen G is displayed, and the end determination unit 303 accordingly determines whether a notification of the closing of the virtual market screen G has been received from the user terminal 10. The end determination unit 303 determines that the end condition is fulfilled when determining that the notification has been received from the user terminal 10.

The user uses audio input to make a remark in the case described above, and the end determination unit 303 may accordingly determine, for example, whether audio data has been received from the user terminal 10 via the communication unit 33. For instance, the end determination unit 303 may determine that the end condition is fulfilled when determining that no reception of audio data from the user terminal 10 has lasted for a predetermined length of time. The predetermined length of time is any length of time determined in advance, for example, any duration of from several seconds to several ten minutes.

The end determination unit 303 may determine whether the end condition is fulfilled based on details of a speech that is indicated by audio data. For example, a phrase that signals the end of dialogue may be determined in advance so that the end determination unit 303 determines whether the phrase has been detected based on the audio data acquired from the user terminal 10. The end determination unit 303 determines that the end condition is fulfilled when determining that the phrase has been detected.

The end condition is any condition determined in advance, and is not limited to the example given above. For instance, the end condition may be the detection of predetermined operation on the operating unit 14, the disconnection of communication to and from the user terminal 10, or a period of no response from the user terminal 10 that lasts for a predetermined length of time or longer.

[3-5. Dialogue Unit]

Each of the plurality of dialogue units 304 is implemented mainly by the control unit 31. When the remark information is acquired, the dialogue unit 304 generates reply information about a reply to a remark that is indicated by the remark information.

An agent described in this embodiment is an example of the dialogue unit 304. Accordingly, an agent can be read as the dialogue unit 304 and the dialogue unit 304 can be read as an agent in the description of this embodiment. The dialogue unit 304 is only required to be a program or part of a program, and may not particularly be what is called an agent.

The dialogue unit 304 may reply, for example, in the form of a sound, in the form of text or an image, or in the form of a sound and text or an image both. In other words, the dialogue unit 304 may reply acoustically, visually, or acoustically and visually both. The reply information may have any data format. For example, the reply information may be audio data, text data, or data containing audio data and text data both.

The reply information may be information that indicates only details of a reply, or may include other types of information. The details of a reply are not required to be a full sentence, and may be, for example, only a word or an emoticon, or only an image. While a case in which the reply information includes probability information about the probability of a reply is described in this embodiment as an example, the reply information may include an agent ID indicating a reply maker, merchandise information, and the like other than the probability information.

The dialogue unit 304 generates the reply information in response to the remark information based on, for example, data that indicates the relation of the reply information to the remark information and the context information. This data uses at least part of the remark information and the context information as input and at least part of the reply information as output. The fixed sentence database DB4 and the reply database DB5 are mainly used in this embodiment to describe an example of this data.

The dialogue unit 304 generates the reply information based on, for example, the reply details included in the context information in addition to the remark information about the user's most recent remark. The dialogue unit 304 may take into consideration all or some of the remark details included in the context information in generating the reply information. The dialogue unit 304 may generate the reply information any time, for example, when the remark information is acquired by the acquisition unit 301, when another dialogue unit 304 generates its reply information, or when the output control unit 306 outputs the reply information.

A case in which the dialogue unit 304 generates the reply information based on the merchandise database DB2, the dialogue database DB3, the fixed sentence database DB4, and the reply database DB5 is described here as an example.

The dialogue unit 304 first acquires a merchandise name that is included in the remark details indicated by the context information of the dialogue database DB3 as the name of a piece of merchandise suggested by another dialogue unit 304. While a case in which the dialogue unit 304 refers to the most recent remark made by another dialogue control unit 304 out of the remark details indicated by the context information is described in this embodiment in order to simplify the description, the dialogue unit 304 may refer to remarks that go back by two or more remarks, or may refer to all remarks.

The dialogue unit 304 refers to the remark information acquired by the acquisition unit 301 (i.e., the most recent remark of the user) to acquire the user's reaction to the piece of merchandise suggested by the other dialogue unit 304. For example, the dialogue unit 304 refers to the user's remark that is acquired after the reply information suggesting the piece of merchandise, and identifies whether the user's reaction is a "positive" reaction, which includes such words and phrases as "Sounds good" and "Yes", or a "negative reaction", which includes such words and phrases as "Hmm" and "Don't like it". Words indicating reactions of users are defined in advance in the data storage unit 300.

The dialogue unit 304 refers to the fixed sentence database DB4 to identify an output condition that applies based on the remark information and on the context information, and determines a fixed sentence. For example, the dialogue unit 304 determines that an output condition "the first remark" is fulfilled when the user's remark is not included in the context information. To give another example, the dialogue unit 304 determines that an output condition "the user approves the most recently suggested merchandise" is fulfilled when the context information includes the name of a piece of merchandise suggested by the dialogue unit 304 or another dialogue unit 304, and the remark information acquired by the acquisition unit 301 indicates a positive reaction of the user.

The dialogue unit 304 determines that an output condition "the user rejects the most recently suggested merchandise" is fulfilled when, for example, the context information includes the name of a piece of merchandise suggested by the dialogue unit 304 or another dialogue unit 304, and the remark information acquired by the acquisition unit 301 indicates a negative reaction of the user. The dialogue unit 304 determines that an output condition "the user expresses his or her intention to purchase" is fulfilled when, for example, the context information includes the name of a piece of merchandise suggested by the dialogue unit 304 or another dialogue unit 304, and the remark information acquired by the acquisition unit 301 indicates the user's intention to purchase.

The dialogue unit 304 identifies an output condition that applies based on words that are included in the remark information and the context information as described above, and acquires a fixed sentence associated with this output condition. When the fixed sentence includes tag information, the dialogue unit 304 then determines a merchandise name to be inserted in the fixed sentence in a manner described below. When the output condition that applies is "the user expresses his or her intention to purchase", the acquired fixed sentence does not include tag information, which means that the insertion of a merchandise name is not required, and the dialogue unit 304 accordingly uses the fixed sentence as a reply without modifying the sentence.

When the output condition that applies is "the first reply", for example, no remark details are found in the context information, and the dialogue unit 304 accordingly searches for a merchandise name to be inserted in the fixed sentence based on the remark information. For instance, the dialogue unit 304 searches its associated merchandise database DB2 based on at least one of words included in the remark information.

When the output condition that applies is "the user approves the most recently suggested merchandise" or "the user rejects the most recently suggested merchandise", the dialogue control unit 304 refers to the reply database DB5 to identify a context condition that applies based on the remark information and on the context information. For instance, the dialogue unit 304 identifies the most recently suggested merchandise by referring to the context information, and identifies the user's reaction by referring to the remark information. The dialogue unit 304 identifies a context condition that applies based on the suggested merchandise and on the user's reaction, and identifies a piece of merchandise that is associated with the identified context condition.

When a context condition "the user approves the most recent suggestion: Suzuki" is fulfilled, for example, the dialogue unit 304 identifies "tomato" as a piece of merchandise to be suggested, and searches its own merchandise database DB2 for "tomato". When a context condition "the user rejects the most recent suggestion: Suzuki" is fulfilled, for example, the dialogue unit 304 identifies "tuna" as a piece of merchandise to be suggested, and searches its own merchandise database DB2 for "tuna".

When a context condition "the user approves the most recent suggestion: tuna" is fulfilled, for example, the dialogue unit 304 identifies "cucumber" as a piece of merchandise to be suggested, and searches its own merchandise database DB2 for "cucumber". When a context condition "the user rejects the most recent suggestion: tuna" is fulfilled, for example, the dialogue unit 304 identifies "Aji" as a piece of merchandise to be suggested, and searches its own merchandise database DB2 for "Aji".

Various methods are applicable to the search for a piece of merchandise itself, and the search may use, for example, the merchandise name included in the reply database DB5 as a search word, or may use the category or other types of information. To give another example, a search based on a feature vector may be executed when a feature vector of merchandise is defined in the merchandise information in advance, by defining a feature vector of a piece of merchandise to be suggested in the reply database DB5 in advance. In the search based on the feature vector, a smaller difference in vector means a higher similarity in feature, namely, a higher probability.

The dialogue unit 304 generates a reply by inserting, in the fixed sentence, the merchandise name of apiece of merchandise that is found in the search conducted in the manner described above. The dialogue unit 304 then generates the probability information from the score acquired in the search. The dialogue unit 304 acquires reply information that includes text information of the generated reply and the generated probability information.

As described above, each of the plurality of dialogue units 304 generates new reply information based on the reply information of another dialogue unit 304 that is output under control of the output unit. The new reply information is a candidate for a reply to the user, and is reply information that has a possibility of being output later.

Each of the plurality of dialogue units 304 generates new reply information based also on remark information about a remark that has been made in response to the reply information output under control of the output control unit 306. In short, the dialogue unit 304 takes into consideration not only the reply information of another dialogue unit 304 but also remark information that indicates the user's reaction to this reply information, in generating new reply information.

Each of the plurality of dialogue units 304 may update the probability information when, for example, the dialogue progresses and the remark information is acquired. The update means recalculation of the probability information. The dialogue unit 304 may update the probability information each time the remark information is acquired, or when the remark information is acquired a predetermined number of times or more. The dialogue unit 304 may update the probability information alone without updating the reply details, or may update both of the reply details and the probability information.

Each of the plurality of dialogue units 304 may determine whether to generate new reply information without waiting for the user's reaction, based on, for example, the probability information that is included in the reply information of another dialogue unit 304 output from the output control unit 306. For instance, the dialogue unit 304 determines whether the probability information that is included in the reply information of the other dialogue unit 304 indicates a probability equal to or higher than a threshold value. The threshold value is any value determined in advance, for example, a probability of most users approving. When the probability is expressed in percentage, the threshold value may be any value of from 70% to 100%.

When determining that the probability indicated by the probability information is equal to or higher than the threshold value, for example, the dialogue unit 304 determines that new reply information is to be generated without waiting for the user's reaction. When determining that the probability indicated by the probability information is lower than the threshold value, the dialogue unit 304 waits for the user's reaction. "Without waiting for the user's reaction" means that the dialogue unit 304 generates new reply information after the output control unit 306 outputs the reply information of another dialogue unit 304 and before the acquisition unit 301 acquires the remark information of the user. "Wait for the user's reaction", on the other hand, means that no new reply information is generated after the output control unit 306 outputs the reply information of another dialogue unit 304, until the acquisition unit 301 acquires the remark information of the user.

Each of the plurality of dialogue units 304 may generate new reply information based on, for example, reply information that is generated by another dialogue unit 304 in any period between a point in time that is determined as the start of a dialogue by the start determination unit 302 and a point in time that is determined as the end of the dialogue by the end determination unit 303. The any period may be the entire period from the start of a dialogue to the end of the dialogue, or may be a part of the entire period. A part of the entire period may be the most recent period of a predetermined length, or a period of a predetermined length in the past that excludes the most recent period. The dialogue unit 304 may take into consideration only a predetermined number of most recent remarks, or all remarks in the serial dialogue with the user.

Each of the plurality of dialogue units 304 is associated with a database about, for example, merchandise or services, and generates new reply information for suggesting a piece of merchandise or a service that differs from the merchandise or service of another dialogue unit 304 to the user, based on its associated database. The new reply information for suggesting a piece of merchandise or a service to the user is information with which the piece of merchandise or the service can be identified, and may be, for example, reply information that includes a merchandise name or a service name, or reply information that includes a merchandise image or an image related to the service. Which dialogue unit 304 is associated with which database is defined in the data storage unit 300 in advance.

While the merchandise database DB2 corresponds to the database described above in this example, a database about services is stored in the data storage unit 300 when a service, instead of merchandise, is provided to the user. Any service may be provided, for example, travel reservation, insurance application, restaurant reservation, lottery purchasing, or a financial service. In this case, the dialogue unit 304 is provided for each service so that, for example, the dialogue unit 304 for insurance application suggests travel insurance and the dialogue unit 304 for restaurant reservation suggests a restaurant while the user is holding dialogue with the dialogue unit 304 for travel reservation.

The merchandise is not limited to food stuff described in this embodiment, and may be any tradable items. The merchandise may be, for example, tangible objects such as clothes, furniture, home electrical appliances, or electronic devices, or may be intangible items (content) such as electronic books, movies, or tunes.

Each of the plurality of dialogue units 304 also generates new reply information for suggesting, to the user, a piece of merchandise or a service related to a piece of merchandise or a service that has been suggested by another dialogue unit 304. For instance, the dialogue unit 304 generates new reply information about a piece of merchandise to be suggested along with a piece of merchandise that has been suggested by another dialogue unit 304, or new reply information about a service to be suggested along with a service that has been suggested by another dialogue unit 304. In this embodiment, pieces of merchandise to be suggested together are defined in the reply database DB5. When a service, instead of merchandise, is provided to the user, however, a database in which services to be suggested together are defined is stored in the data storage unit 300.

While the dialogue unit 304 generates a reply by inserting, to a fixed sentence that is stored in the fixed sentence database DB4, the merchandise information that is stored in the merchandise database DB2 in the case described in this embodiment, data for generating a reply is not limited thereto. For instance, when the dialogue unit 304 is to generate reply information other than the reply information about merchandise or a service, the dialogue unit 304 may identify a word to be inserted in a fixed sentence by defining words that suit the subject of dialogue with the user in a database in advance, and referring to the database. This word may be related to small talk about, for example, weather, place names, or news.

[3-6. Determination Unit]

The determination unit 305 is implemented mainly by the control unit 31. The determination unit 305 determines reply information to be output under control of the output control unit 306, based on the probability information that is included in the reply information of each of the plurality of dialogue units 304. For instance, the determination unit 305 identifies a piece of reply information that has the highest probability through a comparison of pieces of probability information respectively acquired from the plurality of dialogue units 304, and determines the identified reply information as reply information to be output under control of the output control unit 306.

A plurality of pieces of reply information may be determined as reply information to be output under control of the output control unit 306. For instance, the determination unit 305 identifies reply information that has a probability equal to or higher than a threshold value based on pieces of probability information respectively acquired from the plurality of dialogue units 304 and, when there are a plurality of pieces of reply information equal to or higher than the threshold value in terms of probability, may determine all of the pieces of reply information as reply information to be output under control of the output control unit 306. To give another example, the determination unit 305 may identify a predetermined number of pieces (e.g., two or three pieces) of reply information in descending order of probability based on pieces of probability information respectively acquired from the plurality of dialogue units 304, and determine the identified pieces of reply information as reply information to be output under control of the output control unit 306.

[3-7. Output Control Unit]

The output control unit 306 is implemented mainly by the control unit 31. The output control unit 306 outputs the reply information of at least one of the plurality of dialogue units 304. The reply information may be output acoustically or visually, or acoustically and visually both. Specifically, the output control unit 306 may exert control so that a sound indicated by the reply information is output from the audio control unit 17, or so that an image indicated by the reply information is output on the display unit 15, or so that the sound and the image are both output.

The output control unit 306 is implemented by the server 30 in the case described here, and accordingly transmits the reply information to the user terminal 10 via the communication unit 33, to thereby cause the reply information to be output. The user terminal 10 outputs the reply information by following an instruction of the output control unit 306.

[3-8. Execution Unit]

The execution unit 307 is implemented mainly by the control unit 31. The execution unit 307 executes, based on remark information about a remark that is made after a combination of pieces of merchandise or services is suggested to the user by the plurality of dialogue units 304, processing for providing the combination to the user. This processing is, for example, processing of adding apiece of merchandise to a shopping cart, processing of displaying a confirmation screen on which merchandise to be purchased is checked, or payment processing to pay for the merchandise. This processing may also be, for example, processing for signing up to a service or processing for booking a service. The execution unit 307 may be configured to process a piece of merchandise or a service to which the user has reacted positively, while apiece of merchandise or a service to which the user has reacted negatively is excluded as an item to be processed by the execution unit 307.

[4. Processing Executed in this Embodiment]

Figure 11:
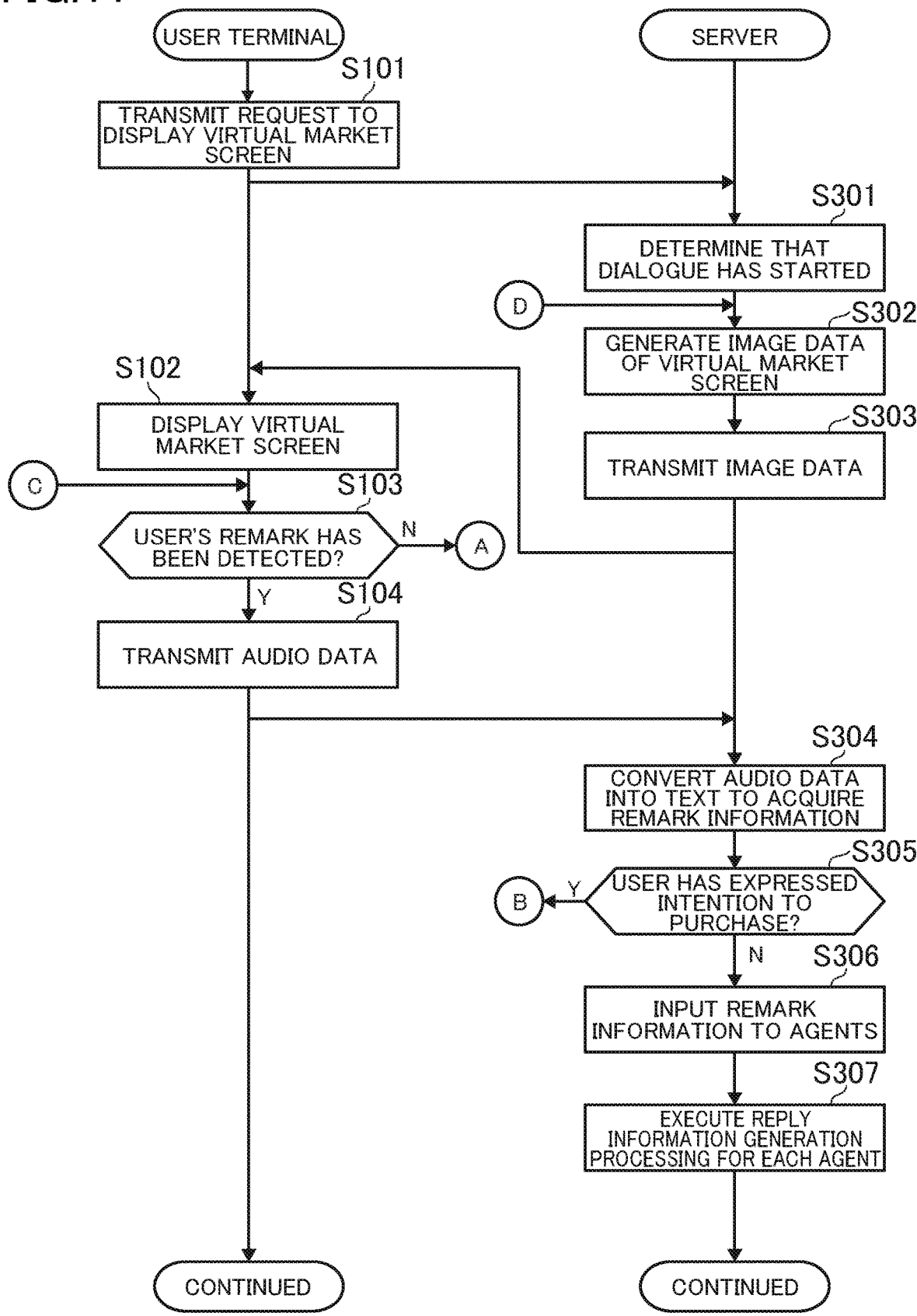
FIG. 11 is a flow chart for illustrating an example of processing that is executed in the dialogue control system.
Figure 12:
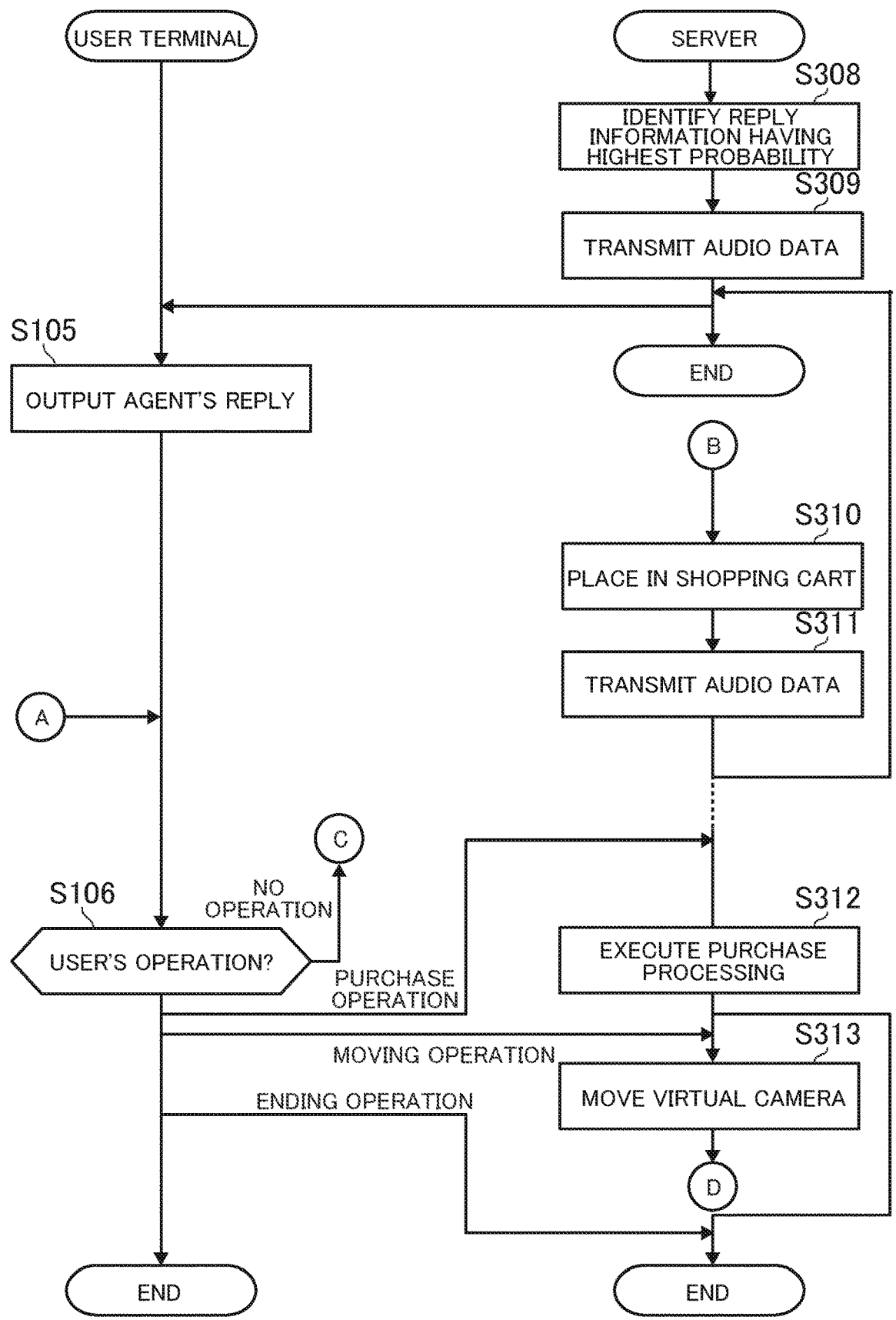
FIG. 12 is a flow chart for illustrating an example of the processing that is executed in the dialogue control system.

FIG. 11 and FIG. 12 are flowcharts for illustrating an example of processing that is executed in the dialogue control system S. The processing illustrated in FIG. 11 and FIG. 12 is executed by the control unit 11 by operating as programmed by a program that is stored in the storage unit 12, and by the control unit 31 by operating as programmed by a program that is stored in the storage unit 32. Processing described below is an example of processing that is executed by the function blocks illustrated in FIG. 5.

As illustrated in FIG. 11, operation for displaying the virtual market screen G is performed first on the user terminal 10, and the control unit 11 transmits a display request to display the virtual market screen G to the server 30 (Step S101). The display request is issued in a format determined in advance, and may include, for example, a URL when the virtual market screen G is to be displayed on a browser, or a screen ID with which a screen is uniquely identified when the virtual market screen G is to be displayed in an app. It is assumed here that, when some information is transmitted from the user terminal 10 to the server 30, a user ID is transmitted along with the information.

The server 30 receives the display request. The control unit 31 then determines that dialogue with the user has started, and updates the dialogue database DB3 (Step S301). In Step S301, the control unit 31 newly generates a dialogue ID, and generates a new record in the dialogue database DB3. The control unit 31 stores the dialogue ID and the user ID in the new record. At this point, none of the user and agents has made a remark, and no data is accordingly stored in the context information.

The control unit 31 generates image data of the virtual market screen G based on the virtual market database DB1 (Step S302), and transmits the generated image data to the user terminal 10 (Step S303). In Step S303, the control unit 31 arranges three-dimensional models of shops in the virtual market and the shops' clerks in a virtual three-dimensional space constructed in the storage unit 32, and places a virtual camera at a freely selected position. The control unit 31 generates image data of the virtual market screen G by performing coordinate transformation on the coordinates of vertices of the three-dimensional models. The virtual camera, which is movable here, may be fixed to one place.

The user terminal 10 receives the image data, and the control unit 11 displays the virtual market screen G on the display unit 15 based on the received image data (Step S102). In Step S102, such a virtual market screen G as the one illustrated in FIG. 2 is displayed, to thereby allow the user to talk to agents that are represented by the agent images A displayed on the virtual market screen G.

The control unit 11 determines whether the user's remark has been detected based on a detection signal of the audio input unit 16 (Step S103). In Step S103, the control unit 11 determines whether the intensity of an audio signal detected by the audio input unit 16 is equal to or higher than a threshold value, or determines whether the intensity of an audio signal in a specific band that indicates the human voice is equal to or higher than a threshold value.

When it is determined that the user's remark has not been detected (Step S103: N), the control unit 11 proceeds to processing of Step S106, which is described later. When it is determined that the user's remark has been detected (Step S103: Y), on the other hand, the control unit 11 transmits audio data that indicates the user's remark to the server 30, based on the detection signal of the audio input unit 16 (Step S104). In Step S104, the control unit 11 digitizes an audio signal detected by the audio input unit 16 to generate audio data that indicates the waveform of a speech, and transmits the audio data.

The server 30 receives the audio data, and the control unit 31 converts the received audio data into text to acquire remark information (Step S304). In Step S304, the control unit 31 estimates details of the remark based on the pattern of the waveform indicated by the audio data, and acquires remark information that indicates the result of estimating details of the remark. The control unit 31 then updates the context information of the dialogue database DB3 by storing the user's ID as the remark maker, storing the remark information as the remark details, and storing the current time as the remark time.

The control unit 31 determines whether the user has expressed his or her intention to purchase, based on the remark information acquired in Step S304 (Step S305). This is accomplished by, for example, storing words that indicate an intention to purchase (e.g., "buy" and "shopping cart") in the storage unit 32 in advance, and determining whether the reply information includes any of the words in Step S305 by the control unit 31.

When determining that the user has not expressed his or her intention to purchase (Step S305: N), the control unit 31 inputs the remark information acquired in Step S304 to each of the plurality of agents (Step S306). In Step S306, the control unit 31 may input text data to all agents but, in this case, inputs text data only to agents whose agent images A are displayed on the virtual market screen G. The control unit 31 inputs text data to, for example, an agent for which the distance between the virtual camera and the three-dimensional model of the clerk represented by the agent image A is less than a threshold value. Each agent is activated in the storage unit 32 in advance to wait for input of text data.

For each agent to which the remark information has been input, the control unit 31 executes reply information generation processing for generating the reply information (Step S307).

Figure 13:
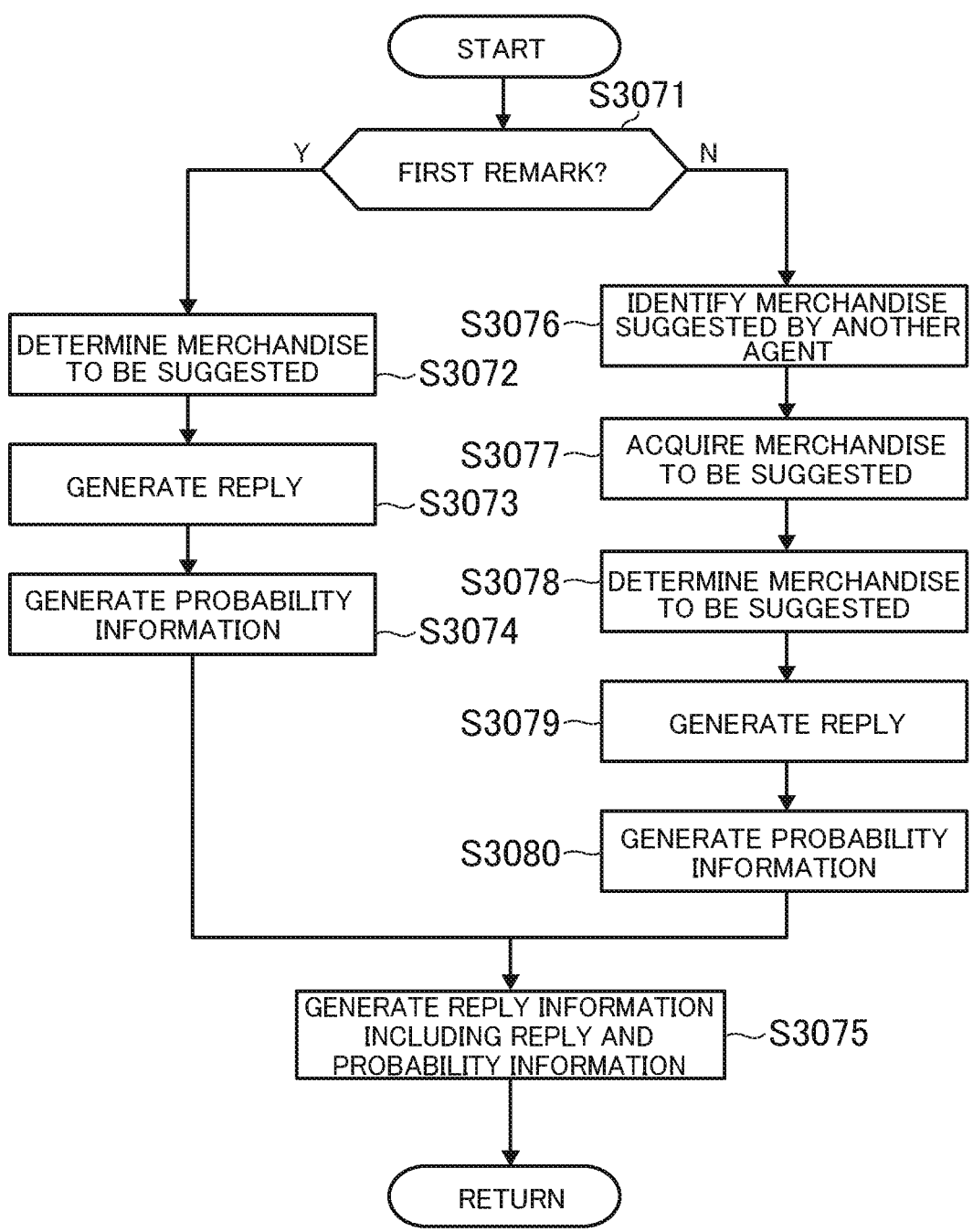
FIG. 13 is a diagram for illustrating details of reply information generation processing, which is executed in Step S307.

FIG. 13 is a diagram for illustrating details of the reply information generation processing, which is executed in Step S307. In the following description of each step, an agent is written as the executioner of the step. In actuality, the control unit 31 is the executioner. The reply information generation processing is executed by every agent to which the remark information has been input.

As illustrated in FIG. 13, the agent determines whether this remark is the first remark based on the context information of the dialogue database DB3 (Step S3071). In Step S3071, the agent determines whether there is an existing remark of the user based on the remark maker information of the context information.

When determining that this remark is the first remark (Step S3071: Y), the agent determines a piece of merchandise to be suggested to the user based on the merchandise database DB2 of a shop that is associated with the agent (Step S3072). In Step S3072, the agent extracts a plurality of words from a sentence indicated by the remark information, and executes a merchandise search with the plurality of words as search keywords. Various known search algorithms are applicable to the keyword-based merchandise search itself. For example, the agent calculates a score for each piece of merchandise in Step S3072, based on how many of the words included in the user's remark are found in the merchandise description, and determines a piece of merchandise that has the highest score as a piece of merchandise to be suggested to the user.

For instance, when the user says "What is recommended this time of year?" as in FIG. 3 and FIG. 4, the agent extracts four words, "this", "time", "year", and "recommend". The agent uses the four words as search keywords to search its own merchandise database DB2, and determines a piece of merchandise that has the highest score as a piece of merchandise to be suggested to the user.

The agent generates a reply based on the result of the processing of Step S3072 and on the fixed sentence database DB4 (Step S3073). In Step S3073, the agent generates a reply by inserting the merchandise name of the piece of merchandise that has been found in the search of Step S3072 to a fixed sentence whose output condition is "the first reply".

The agent generates the probability information based on the result of the processing of Step S3073 (Step S3074). In Step S3074, the agent sets a higher probability in the probability information for a piece of merchandise that has a higher score, and sets a lower probability in the probability information for a piece of merchandise that has a lower score. For example, the agent may use the score of merchandise as the probability information without modifying the score, or may use a value that is acquired by substituting the score of merchandise in a predetermined numerical expression as the probability information.

The agent generates reply information that includes the reply and the probability information (Step S3075). The processing up through this step is executed for every agent to which the remark information has been input.

When it is determined in Step S3071 that this remark is not the first remark (Step S3071: N), on the other hand, the agent identifies a piece of merchandise that has been suggested by another agent, based on the context information of the dialogue database DB3 (Step S3076). In Step S3076, the agent refers to the context information to acquire a merchandise name that is included in the most recent reply of another agent.

The agent acquires a piece of merchandise to be suggested by the agent, based on the piece of merchandise identified in Step S3076 and on the reply database DB5 (Step S3077). In Step S3077, the agent refers to the context information of the dialogue database DB3 to acquire a remark made by the user with respect to the piece of merchandise that has most recently been suggested by the other agent. The agent determines whether the acquired remark is positive or negative. The agent refers to the reply database DB5 to identify a context condition to be fulfilled, based on the piece of merchandise suggested by the other agent and on the user's reaction to the suggested merchandise. The agent identifies a piece of merchandise that is associated with the identified context condition as a piece of merchandise to be suggested.

The agent determines a piece of merchandise to be suggested to the user based on its own merchandise database DB2 (Step S3078). In Step S3078, the agent executes a merchandise search with the merchandise name of the piece of merchandise to be suggested as a search keyword. The agent determines apiece of merchandise that has the highest score as a piece of merchandise to be suggested to the user.

The agent generates a reply based on the result of the processing of Step S3078 and on the fixed sentence database DB4 (Step S3079). In Step S3079, the agent generates a reply by inserting the merchandise name of the piece of merchandise that has been found in the search of Step S3078 to a fixed sentence.

The agent generates the probability information based on the result of the processing of Step S3079 (Step S3080), and proceeds to the processing of Step S3075. The processing of FIG. 13 described above is executed for each agent to which the remark information has been input.

Returning to FIG. 12, the control unit 31 compares the pieces of probability information that are included in the pieces of reply information generated by the agents, and identifies a piece of reply information that has the highest probability (Step S308). The control unit 31 converts the piece of reply information identified in Step S308 into audio data, and transmits the audio data to the user terminal 10 (Step S309). In Step S309, the control unit 31 updates the context information of the dialogue database DB3 by storing the agent ID of the agent that has generated the piece of reply information having the highest probability as the remark maker, and storing the piece of reply information as the remark details. The control unit 31 then stores the shop ID of a shop associated with this agent and the merchandise ID of a piece of merchandise included in the piece of reply information in the context information, and stores the current time as the remark time. As described above, when a probability indicated by the probability information is equal to or higher than a threshold value, the control unit 31 may determine that the user approves, and control each agent so that the agent generates new reply information without waiting for the user's reaction.

The user terminal 10 receives the audio data, and the control unit 11 outputs the agent's reply from the audio output unit 17 based on the received audio data (Step S105), and proceeds to processing of Step S106, which is described later.

When it is determined in Step S305 of FIG. 11 that the user has expressed his or her intention to purchase (Step S305: Y), on the other hand, the control unit 31 proceeds to steps of FIG. 12 to execute processing of placing a piece of merchandise that has been mentioned in the dialogue in the shopping cart based on the dialogue database DB3 (Step S310). The control unit 31 transmits audio data that represents words of appreciation of an agent that is associated with the piece of merchandise (Step S311), and proceeds to processing of Step S309. In this case, the words of the agent's appreciation are output from the audio output unit 17 of the user terminal 10. In Step S309, the control unit 31 updates the context information of the dialogue database DB3 by storing the agent ID of the agent that has suggested the piece of merchandise placed in the shopping cart as the remark maker, storing a fixed sentence as the remark details, and storing the current time as the remark time.

When the audio data is output on the user terminal 10 in Step S105, the control unit 11 identifies the user's operation based on a detection signal of the operating unit 14 (Step S106). In this case, the user's operation may be purchase operation for purchasing a piece of merchandise in the shopping cart, moving operation for moving the virtual camera, or ending operation for ending the transaction without purchasing merchandise.

When it is determined that the user has performed no operation (Step S106: no operation), the control unit 11 returns to the processing of Step S103. When it is determined that the purchase operation has been executed (Step S106: purchase operation), on the other hand, a notification of the execution of the purchase operation is transmitted to the server 30, the server 30 receives the notification, and the control unit 31 executes purchase processing (Step S312). This processing is then ended.

When the user's operation is the moving operation (Step S106: moving operation), a notification of the execution of the moving operation is transmitted to the server 30, the server 30 receives the notification, and the control unit 31 moves the virtual camera (Step S313) and returns to the processing of Step S302. In this case, image data of the virtual market screen G is generated based on information of the moved virtual camera.

When the user's operation is the ending operation (Step S106: ending operation), a notification of the execution of the ending operation is transmitted to the server 30, and this processing is ended. In this case, the server 30 determines that the dialogue has ended.

According to the dialogue control system S described above, each agent generates the reply information taking into consideration not only the remark information about the user's most recent remark but also the reply information of another agent, and a burden imposed on the user in an attempt to provide a reply that fits in the flow of dialogue can consequently be lightened. The burden on the user is lightened because, for example, the vegetable shop agent is capable of suggesting a recommended piece of merchandise from its shop in conjunction with a piece of merchandise that is suggested by the fish shop agent, without requiring the user to tell details of the user's dialogue with the fish shop agent to the vegetable shop agent.

In generating the reply information, each agent also takes into consideration the user's reaction by considering the remark information about a remark that is made by the user in response to another agent's reply indicated by the reply information. A reply that fits more in the flow of dialogue can thus be provided.

The dialogue control system S is also capable of raising the accuracy of a reply even more by determining which reply information is to be output based on the probability information of a piece of reply information generated by each agent, and thus outputting a piece of reply information that is high in probability. In addition, a piece of reply information that is low in probability is prevented from being transmitted by determining which reply information is to be output based on the probability information, which lightens the processing load of the dialogue control system S and a communication load on a network. The output of a piece of reply information that is low in probability and the resultant situation in which the user is required to express a negative reaction each time a piece of reply information that is low in probability is output can be prevented as well, and the user's burden can therefore be lightened effectively.

Each agent updates the probability information as the dialogue progresses, thereby reflecting the latest flow of the dialogue on the probability information and enabling the agent to provide a reply that fits more in the flow of the dialogue. The enhanced accuracy of the probability information also leads to effective prevention of the transmission of an unnecessary piece of reply information, which lightens the processing burden of the dialogue control system more effectively and lightens the communication load on a network more effectively. Another advantage of the enhanced accuracy of the probability information is the prevention of a situation in which the user is required to express a negative reaction each time the reply information is output due to a failure to output apiece of reply information that is wanted by the user. The user's burden can effectively be lightened as a result.

Each agent determines whether to generate new reply information without waiting for the user's reaction, based on the probability information that is included in the reply information of another agent, thereby allowing the dialogue control system S to output, when the previously output reply information is, for example, very high in the probability of gaining the user's approval, new reply information in the wake of the preceding reply information, without waiting for the user's reaction. Information desired by the user can accordingly be provided one after another without requiring the user to express his or her reaction each time.

Each agent generates reply information in consideration of context in any period from the start of the dialogue to the end of the dialogue, thereby providing a reply that fits in the flow of a dialogue.

Each agent generates reply information that suggests a piece of merchandise from its shop based on the merchandise database DB2 that is associated with the agent, thereby providing effective assistance in purchasing merchandise. When the dialogue control system S is applied to the provision of services, too, each agent generates reply information that suggests its associated service based on a service database that is associated with the agent, thereby providing effective assistance in using a service. Each agent is also capable of recommending merchandise or a service in conjunction with a piece of merchandise or a service that is recommended by another agent without requiring the user to tell each agent what merchandise or service has been recommended by another agent, and the user's burden is accordingly lightened.

Each agent suggests a piece of merchandise that is related to a piece of merchandise suggested by another agent, thereby providing more effective assistance in purchasing merchandise.

When the dialogue control system S is applied to the provision of services, too, each agent suggests a service that is related to a service suggested by another agent, thereby providing more effective assistance in using a service. The suggestion of a piece of merchandise or a service that is irrelevant to the flow of dialogue and the resultant situation in which the user is required to express a negative reaction each time such suggestion is made can be prevented as well, and the user's burden can therefore be lightened effectively.

The dialogue control system S executes processing of placing a piece of merchandise in a shopping cart and payment processing for paying for the piece of merchandise when the user expresses his or her intention to purchase, thereby providing more effective assistance in purchasing merchandise. When the dialogue control system S is applied to the provision of services, too, the dialogue control system S executes reservation processing and sign-up processing when the user expresses his or her intention to use a service, thereby providing more effective assistance in using a service. In addition, the dialogue control system S enables the user to purchase merchandise or use a service in a serial dialogue, which effectively lightens a burden imposed on the user when the user tries to purchase merchandise or use a service.

The dialogue control system S acquires remark information based on the user's speech, thereby providing a reply that fits in the flow of dialogue in the form of a sound.

[5. Modification Examples]

The present invention is not limited to the embodiment described above, and can be modified suitably without departing from the spirit of the present invention.

For example, each of the plurality of dialogue units 304 may generate new reply information based on the relation between the dialogue unit 304 and another dialogue unit 304 that has generated the reply information output under control of the output control unit 306. The dialogue unit 304 generates its own reply information based on, for example, the reply information of a specific dialogue unit 304 out of other dialogue units 304. For each dialogue unit 304, the reply information of which dialogue unit 304 is to be referred to by the dialogue unit 304 is defined in the data storage unit 300 in advance. The dialogue unit 304 generates its own reply information based on the reply information of another dialogue unit 304 that is associated with itself.

The fish shop agent, for example, generates its own reply information based on the reply information of the vegetable shop agent, but is not particularly required to refer to the reply information of a clothing shop agent. Similarly, the clothing shop agent generates its own reply information based on the reply information of a shoe shop agent, but is not particularly required to refer to the reply information of the fish shop agent and the reply information of the vegetable shop agent.

According to the modification example described above, each agent is prevented from referring to a piece of reply information that is irrelevant to the agent, which effectively enhances the accuracy of a reply. In addition, an agent irrelevant to the current dialogue is prevented from generating the reply information, and the processing load of the dialogue control system S can accordingly be lightened. The enhanced accuracy of a reply also prevents the output of a piece of reply information that is low in probability and a situation in which the user is required to express a negative reaction each time a piece of reply information that is low in probability is output, and the user's burden can therefore be lightened effectively.

The audio input unit 16 and the audio output unit 17, which are included inside the user terminal 10 in the case described above, may be, for example, external units connected to the user terminal 10. Similarly, the operating unit 14 and the display unit 15 may be external units connected to the user terminal 10.

The virtual market, which is three-dimensional in the description given above, may be, for example, two-dimensional. The dialogue control system S may also be configured so that, for example, the user is allowed to hold dialogue with an agent without particularly displaying the virtual market screen G. For instance, the user may hold dialogue with an agent on a top page of an Internet shopping mall or a page of each shop.

While the server 30 implements the functions in the case described above, the task of implementing the functions may be shared between the user terminal 10 and the server 30, or the user terminal 10 may implement all functions. For instance, the acquisition unit 301 may be implemented mainly by the control unit 11 of the user terminal 10. In this case, the processing of converting audio data to text data, for example, may be executed on the user terminal 10. To give another example, the dialogue units 304 may be implemented mainly by the control unit 11 of the user terminal 10 to activate agents in the user terminal 10. The output control unit 306, for example, may be implemented mainly by the control unit 11 of the user terminal 10.

Out of the functions of the dialogue control system S, functions other than the acquisition unit 301, the dialogue units 304, and the output control unit 306, for example, may be omitted. For instance, the data storage unit 300 is not required to be included in the dialogue control system S, and may be implemented by a database server.

The invention claimed is:

1. A dialogue control system, comprising at least one processor configured to:
acquire remark information about a remark of a user;
control a plurality of dialogue generators each for generating, when the remark information is acquired, reply information about a reply to be made in response to the remark indicated by the remark information; and
output the reply information generated by at least one of a plurality of dialogue generators,
wherein the acquisition of the remark information and the output of the reply information are repeated so that a dialogue progresses, and
wherein each of the plurality of dialogue generators is configured to generate new reply information based on output reply information that has been generated and output by another of the plurality of dialogue generators;
wherein the reply information includes probability information about a probability of details of a reply,
wherein the at least one processor determines the reply information to be output, based on the probability information included in the reply information generated by each of the plurality of dialogue generators, and
wherein each of the plurality of dialogue generators is configured to update the probability information when the remark information is acquired as the dialogue progresses.

2. The dialogue control system according to claim 1, wherein each of the plurality of dialogue generators is configured to generate the new reply information based further on the remark information about a remark made in response to a reply that is indicated by the reply information.

3. The dialogue control system according to claim 1, wherein each of the plurality of dialogue generators is configured to determine whether to generate the new reply information without waiting for a reaction of the user, based on the probability information included in the reply information that has been generated by another of the plurality of dialogue generators and that has been output.

4. A dialogue control system, comprising at least one processor configured to:
acquire remark information about a remark of a user;
control a plurality of dialogue generators each for generating, when the remark information is acquired, reply information about a reply to be made in response to the remark indicated by the remark information; and
output the reply information generated by at least one of a plurality of dialogue generators,
wherein the acquisition of the remark information and the output of the reply information are repeated so that a dialogue progresses, and
wherein each of the plurality of dialogue generators is configured to generate new reply information based on output reply information that has been generated and output by another of the plurality of dialogue generators,
wherein the at least one processor is configured to:
determine that the dialogue has started when a predetermined start condition is fulfilled; and
determine that the dialogue has ended when a predetermined end condition is fulfilled,
wherein each of the plurality of dialogue generators is configured to generate the new reply information based on the output reply information that has been generated by another of the plurality of dialogue generators in a period of any length between a point in time determined as a start of the dialogue and a point in time determined as an end of the dialogue.

5. The dialogue control system according to claim 1, wherein each of the plurality of dialogue generators is configured to generate the new reply information based on a relation between each of the plurality of dialogue generators and another of the plurality of dialogue generators that has generated and output the reply information.

6. A dialogue control system, comprising at least one processor configured to:
acquire remark information about a remark of a user;
control a plurality of dialogue generators each for generating, when the remark information is acquired, reply information about a reply to be made in response to the remark indicated by the remark information; and
output the reply information generated by at least one of a plurality of dialogue generators,
wherein the acquisition of the remark information and the output of the reply information are repeated so that a dialogue progresses, and
wherein each of the plurality of dialogue generators is configured to generate new reply information based on output reply information that has been generated and output by another of the plurality of dialogue generators, wherein each of the plurality of dialogue generators is associated with a database about merchandise or a service, and wherein each of the plurality of dialogue generators is configured to generate the new reply information for suggesting, to the user, the merchandise or service different from the merchandise or service of another of the plurality of dialogue generators, based on the database associated with each of the plurality of dialogue generators.

7. The dialogue control system according to claim 6, wherein each of the plurality of dialogue generators is configured to generate the new reply information for suggesting, to the user, the merchandise or service related to the merchandise or the service that has been suggested by another of the plurality of dialogue generators.

8. A dialogue control system, comprising at least one processor configured to:

acquire remark information about a remark of a user;

control a plurality of dialogue generators each for generating, when the remark information is acquired, reply information about a reply to be made in response to the remark indicated by the remark information; and output the reply information generated by at least one of a plurality of dialogue generators, wherein the acquisition of the remark information and the output of the reply information are repeated so that a dialogue progresses, and wherein each of the plurality of dialogue generators is configured to generate new reply information based on output reply information that has been generated and output by another of the plurality of dialogue generators, wherein the at least one processor executes processing for providing a combination of suggested pieces of merchandise or a combination of suggested services to the user, based on the remark information about a remark made after the combination of suggested pieces of merchandise or the the combination of suggested services is suggested to the user by each of the plurality of dialogue generators.

9. The dialogue control system according to claim 1, wherein the at least one processor is configured to acquire the remark information based on a speech of the user that has been detected by an audio input device.

10. The dialogue control system according to claim 1, wherein the output reply information indicates a first merchandise on an internet and the new reply information indicates a second merchandise that is recommended along with the first merchandise.

* * * * *